(12) United States Patent
Tian et al.

(10) Patent No.: US 12,167,424 B2
(45) Date of Patent: Dec. 10, 2024

(54) OPERATIONS FOR OVERLAPPING DOWNLINK COMMUNICATIONS WITH DIFFERENT RESOURCE ALLOCATIONS

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Mostafa Khoshnevisan, San Diego, CA (US); Zhifei Fan, San Diego, CA (US); Ahmed Abdelaziz Ibrahim Abdelaziz Zewail, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 17/577,993

(22) Filed: Jan. 18, 2022

(65) Prior Publication Data
US 2023/0232432 A1      Jul. 20, 2023

(51) Int. Cl.
*H04W 56/00* (2009.01)
*H04L 1/00* (2006.01)
(Continued)

(52) U.S. Cl.
CPC ........... *H04W 72/51* (2023.01); *H04L 1/0003* (2013.01); *H04W 72/0446* (2013.01); *H04W 72/1263* (2013.01)

(58) Field of Classification Search
CPC ............. H04W 72/51; H04W 72/0446; H04W 72/1263; H04L 1/0003
(Continued)

(56) References Cited

U.S. PATENT DOCUMENTS

2020/0374089 A1    11/2020    Yang et al.
2021/0307050 A1    9/2021    Khoshnevisan et al.
(Continued)

FOREIGN PATENT DOCUMENTS

EP          3944699 A1      1/2022
WO    WO-2020188822 A1     9/2020

OTHER PUBLICATIONS

International Search Report and Written Opinion—PCT/US2022/082064—ISA/EPO—Apr. 21, 2023 (2107152WO).

*Primary Examiner* — Sai Ming Chan
(74) *Attorney, Agent, or Firm* — Paul M. McAdams; Holland & Hart LLP

(57) ABSTRACT

Methods, systems, and devices for wireless communications are described. A wireless communications device, such as a user equipment (UE) may transmit a capability message indicating a capability of the UE to receive one or more downlink messages during a time slot, and may receive one or more control signalings which schedule a first and a second downlink message during the time slot, indicate a first resource allocation scheduled by a first scheduling configuration, and indicate a second resource allocation scheduled by a second scheduling configuration. The UE may monitor for one or both of the first downlink message or the second downlink message during the time slot based on the one or more control signalings and the capability message. The capability message may indicate a capability of the UE to receive a single downlink message or receive more than one downlink message during the time slot.

24 Claims, 19 Drawing Sheets

(51) Int. Cl.
*H04W 72/0446* (2023.01)
*H04W 72/1263* (2023.01)
*H04W 72/51* (2023.01)

(58) Field of Classification Search
USPC .......................................... 370/329
See application file for complete search history.

(56) References Cited

U.S. PATENT DOCUMENTS

| | | |
|---|---|---|
| 2021/0360653 A1 | 11/2021 | Khoshnevisan et al. |
| 2022/0271873 A1* | 8/2022 | Gao ...................... H04L 1/1854 |
| 2023/0164761 A1* | 5/2023 | Gerami ................ H04W 72/23 |
| | | 370/329 |
| 2023/0198677 A1* | 6/2023 | Gou ................ H04W 72/1273 |
| | | 370/329 |
| 2023/0269741 A1* | 8/2023 | Li ........................ H04L 5/0091 |
| | | 370/329 |

* cited by examiner

OPERATIONS FOR OVERLAPPING DOWNLINK COMMUNICATIONS WITH DIFFERENT RESOURCE ALLOCATIONS

FIELD OF TECHNOLOGY

The following relates to wireless communications, including operations for overlapping downlink communications with different resource allocations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with a base station based on a scheduling configuration (e.g., a semi-persistent scheduling (SPS) configuration) that allocates or indicates a number of resources for communications at the UE (e.g., resources for transmissions to and from the UE) periodically. In some examples, the UE may be configured by the base station with more than one SPS configuration. Different SPS configurations may have different periodicities of allocated resources and may have each indicate time domain or frequency domain resource allocations (FDRAs), or both making it possible that two SPS configurations may schedule downlink data in a same time slot (e.g., overlapping transmission start and duration times based on start length indicator values (SLIV)).

SUMMARY

The described techniques relate to improved methods, systems, devices, and apparatuses that support operations for overlapping downlink communications with different resource allocations. Generally, the described techniques provide mechanisms for receiving overlapping-downlink data channels and mitigating receiving errors associated with overlapping downlink data messages.

In some wireless communications systems, a UE may be capable of receiving a single downlink data channel during a time slot. In such examples, when two downlink data channels associated with different scheduling configurations are scheduled in a same time slot, the UE may be configured to receive one of the downlink data channels based on a number of bits to be carried, a repetition factor k, priority, modulation and coding scheme (MCS), among other example parameters of the downlink data channel. The UE may also select suitable resources for receiving the downlink data channel out of the resource allocations of all overlapping downlink data channels in a same time slot.

In some wireless communications systems, the UE may be capable of receiving multiple downlink data channels in a time slot. When two downlink data channels associated with different scheduling configurations are scheduled in a same time slot, a beam switching gap may be considered. For example, when two downlink data channels may be received using a same communication beam, the UE may receive both downlink data channels. In some other examples, when two downlink data channels are scheduled by scheduling configurations associated with different communication beams or transmission configuration indication (TCI) states, both downlink data channels may be received, however one downlink data channel may be partially received or may not be received when a gap of time between the two time resource allocations (e.g., associated with the downlink data channels) is not large enough for beam switching. In some such examples, the UE may switch one of the downlink data channels to a same communication beam as the other to receive both downlink data channels.

A method for wireless communication at a UE is described. The method may include transmitting, to a base station, a capability message indicating a capability of the UE to receive one or more downlink messages during a time slot, receiving, from the base station, one or more control signalings which schedule a first downlink message and a second downlink message during the time slot, indicate a first resource allocation scheduled by a first SPS configuration, and indicate a second resource allocation scheduled by a second SPS configuration, and monitoring for one or both of the first downlink message and the second downlink message during the time slot based on the one or more control signalings and the capability message.

An apparatus for wireless communication at a UE is described. The apparatus may include a processor, memory coupled with the processor, and instructions stored in the memory. The instructions may be executable by the processor to cause the apparatus to transmit, to a base station, a capability message indicating a capability of the UE to receive one or more downlink messages during a time slot, receive, from the base station, one or more control signalings which schedule a first downlink message and a second downlink message during the time slot, indicate a first resource allocation scheduled by a first SPS configuration, and indicate a second resource allocation scheduled by a second SPS configuration, and monitor for one or both of the first downlink message and the second downlink message during the time slot based on the one or more control signalings and the capability message.

Another apparatus for wireless communication at a UE is described. The apparatus may include means for transmitting, to a base station, a capability message indicating a capability of the UE to receive one or more downlink messages during a time slot, means for receiving, from the base station, one or more control signalings which schedule a first downlink message and a second downlink message during the time slot, indicate a first resource allocation scheduled by a first SPS configuration, and indicate a second resource allocation scheduled by a second SPS configuration, and means for monitoring for one or both of the first downlink message and the second downlink message during the time slot based on the one or more control signalings and the capability message.

A non-transitory computer-readable medium storing code for wireless communication at a UE is described. The code may include instructions executable by a processor to transmit, to a base station, a capability message indicating a capability of the UE to receive one or more downlink messages during a time slot, receive, from the base station, one or more control signalings which schedule a first downlink message and a second downlink message during the time slot, indicate a first resource allocation scheduled by a first SPS configuration, and indicate a second resource allocation scheduled by a second SPS configuration, and monitor for one or both of the first downlink message and the second downlink message during the time slot based on the one or more control signalings and the capability message.

In some examples of the method, apparatuses, and non-transitory computer-readable medium described herein, the capability message indicates that the UE may be capable of receiving a single downlink message during the time slot and the method, apparatuses, and non-transitory computer-readable medium may include further operations, features, means, or instructions for receiving the first downlink message during the time slot based on the one or more control signalings and the capability message.

Some examples of the method, apparatuses, and non-transitory computer-readable medium described herein may further include operations, features, means, or instructions for receiving, via the first resource allocation, the first downlink message during the time slot based on the one or more control signalings and the capability message, where the first downlink message includes a larger transport block size, a larger number of coded bits, or both, than the second downlink message.

Some examples of the method, apparatuses, and non-transitory computer-readable medium described herein may further include operations, features, means, or instructions for receiving, via the first resource allocation, the first downlink message during the time slot based on the one or more control signalings and the capability message, where the first downlink message includes a smaller number of configured repetitions than the second downlink message.

Some examples of the method, apparatuses, and non-transitory computer-readable medium described herein may further include operations, features, means, or instructions for receiving, via the first resource allocation, the first downlink message during the time slot based on the one or more control signalings and the capability message, where the first downlink message may be associated with a higher priority than the second downlink message.

Some examples of the method, apparatuses, and non-transitory computer-readable medium described herein may further include operations, features, means, or instructions for receiving, via the first resource allocation, the first downlink message during the time slot based on the one or more control signalings and the capability message, where the first downlink message may be associated with a lower MCS than the second downlink message.

Some examples of the method, apparatuses, and non-transitory computer-readable medium described herein may further include operations, features, means, or instructions for receiving, via the first resource allocation, the first downlink message during the time slot based on the one or more control signalings and the capability message, where the first SPS configuration may be associated with an index value smaller than an index value associated with the second SPS configuration.

Some examples of the method, apparatuses, and non-transitory computer-readable medium described herein may further include operations, features, means, or instructions for receiving, via the second resource allocation, the first downlink message during the time slot based on the one or more control signalings and the capability message, where the second resource allocation may be larger than the first resource allocation.

Some examples of the method, apparatuses, and non-transitory computer-readable medium described herein may further include operations, features, means, or instructions for receiving the first downlink message may be based on a transport block size corresponding to the second resource allocation.

In some examples of the method, apparatuses, and non-transitory computer-readable medium described herein, the first downlink message may be associated with a higher MCS than the second downlink message.

In some examples of the method, apparatuses, and non-transitory computer-readable medium described herein, the first downlink message may be associated with a lower MCS than the second downlink message.

Some examples of the method, apparatuses, and non-transitory computer-readable medium described herein may further include operations, features, means, or instructions for receiving the first downlink message during the time slot based on the one or more control signalings and the capability message, where the first downlink message may be received via a third resource allocation that includes at least a portion of the first resource allocation and the second resource allocation.

In some examples of the method, apparatuses, and non-transitory computer-readable medium described herein, the one or more control signalings indicate that the first downlink message and the second downlink message may be not overlapping in time and the first downlink message and the second downlink message each correspond to a same TCI state and the method, apparatuses, and non-transitory computer-readable medium may include further operations, features, means, or instructions for receiving, using a same receive beam corresponding to the same TCI state, the first downlink message and the second downlink message via the first resource allocation or the second resource allocation, or both based on the one or more control signalings and the capability message.

In some examples of the method, apparatuses, and non-transitory computer-readable medium described herein, the one or more control signalings indicate the first downlink message and the second downlink message may be not overlapping in time and the first downlink message and the second downlink message each correspond to different TCI states and the method, apparatuses, and non-transitory computer-readable medium may include further operations, features, means, or instructions for receiving, using a first receive beam corresponding to a first TCI state of the different TCI states, at least a portion of the first downlink message via the first resource allocation based on the one or more control signalings and the capability message and receiving, using a second receive beam corresponding to a second TCI state of the different TCI states, at least a portion of the second downlink message via the second resource allocation based on the one or more control signalings and the capability message.

A method is described. The method may include receiving, from a UE, a capability message indicating a capability of the UE to receive one or more downlink messages during a time slot, transmitting, to the UE, one or more control signalings which schedule a first downlink message and a second downlink message during the time slot, indicate a first resource allocation scheduled by a first SPS configuration, and indicate a second resource allocation scheduled by a second SPS configuration, and transmitting one or both of the first downlink message and the second downlink message during the time slot based on the one or more control signalings and the capability message.

An apparatus is described. The apparatus may include a processor, memory coupled with the processor, and instructions stored in the memory. The instructions may be executable by the processor to cause the apparatus to receive, from a UE, a capability message indicating a capability of the UE to receive one or more downlink messages during a time slot, transmit, to the UE, one or more control signalings which schedule a first downlink message and a second downlink message during the time slot, indicate a first resource allocation scheduled by a first SPS configuration, and indicate a second resource allocation scheduled by a second SPS configuration, and transmit one or both of the first downlink message and the second downlink message during the time slot based on the one or more control signalings and the capability message.

Another apparatus is described. The apparatus may include means for receiving, from a UE, a capability message indicating a capability of the UE to receive one or more downlink messages during a time slot, means for transmitting, to the UE, one or more control signalings which schedule a first downlink message and a second downlink message during the time slot, indicate a first resource allocation scheduled by a first SPS configuration, and indicate a second resource allocation scheduled by a second SPS configuration, and means for transmitting one or both of the first downlink message and the second downlink message during the time slot based on the one or more control signalings and the capability message.

A non-transitory computer-readable medium storing code is described. The code may include instructions executable by a processor to receive, from a UE, a capability message indicating a capability of the UE to receive one or more downlink messages during a time slot, transmit, to the UE, one or more control signalings which schedule a first downlink message and a second downlink message during the time slot, indicate a first resource allocation scheduled by a first SPS configuration, and indicate a second resource allocation scheduled by a second SPS configuration, and transmit one or both of the first downlink message and the second downlink message during the time slot based on the one or more control signalings and the capability message.

In some examples of the method, apparatuses, and non-transitory computer-readable medium described herein, the capability message indicates that the UE may be capable of receiving a single downlink message during the time slot and the method, apparatuses, and non-transitory computer-readable medium may include further operations, features, means, or instructions for transmitting the first downlink message during the time slot based on the one or more control signalings and the capability message.

Some examples of the method, apparatuses, and non-transitory computer-readable medium described herein may further include operations, features, means, or instructions for transmitting, via the first resource allocation, the first downlink message during the time slot based on the one or more control signalings and the capability message, where the first downlink message includes a larger transport block size, a larger number of coded bits, or both, than the second downlink message.

Some examples of the method, apparatuses, and non-transitory computer-readable medium described herein may further include operations, features, means, or instructions for transmitting, via the first resource allocation, the first downlink message during the time slot based on the one or more control signalings and the capability message, where the first downlink message includes a smaller number of configured repetitions than the second downlink message.

Some examples of the method, apparatuses, and non-transitory computer-readable medium described herein may further include operations, features, means, or instructions for transmitting, via the first resource allocation, the first downlink message during the time slot based on the one or more control signalings and the capability message, where the first downlink message may be associated with a higher priority than the second downlink message.

Some examples of the method, apparatuses, and non-transitory computer-readable medium described herein may further include operations, features, means, or instructions for transmitting, via the first resource allocation, the first downlink message during the time slot based on the one or more control signalings and the capability message, where the first downlink message may be associated with a lower MCS than the second downlink message.

Some examples of the method, apparatuses, and non-transitory computer-readable medium described herein may further include operations, features, means, or instructions for transmitting, via the first resource allocation, the first downlink message during the time slot based on the one or more control signalings and the capability message, where the first SPS configuration may be associated with an index value smaller than an index value associated with the second SPS configuration.

Some examples of the method, apparatuses, and non-transitory computer-readable medium described herein may further include operations, features, means, or instructions for transmitting, via the second resource allocation, the first downlink message during the time slot based on the one or more control signalings and the capability message, where the second resource allocation may be larger than the first resource allocation.

Some examples of the method, apparatuses, and non-transitory computer-readable medium described herein may further include operations, features, means, or instructions for transmitting the first downlink message may be based on a transport block size corresponding to the second resource allocation.

In some examples of the method, apparatuses, and non-transitory computer-readable medium described herein, the first downlink message may be associated with a higher MCS than the second downlink message.

In some examples of the method, apparatuses, and non-transitory computer-readable medium described herein, the first downlink message may be associated with a lower MCS than the second downlink message.

Some examples of the method, apparatuses, and non-transitory computer-readable medium described herein may further include operations, features, means, or instructions for transmitting the first downlink message during the time slot based on the one or more control signalings and the capability message, where the first downlink message may be transmitted via a third resource allocation that includes at least a portion of the first resource allocation and the second resource allocation.

In some examples of the method, apparatuses, and non-transitory computer-readable medium described herein, the one or more control signalings indicate that the first downlink message and the second downlink message may be not overlapping in time and the first downlink message and the second downlink message each correspond to a same TCI state and the method, apparatuses, and non-transitory computer-readable medium may include further operations, features, means, or instructions for transmitting, using a same transmit beam corresponding to the same TCI state, the first downlink message and the second downlink message via the first resource allocation or the second resource allocation, or both based on the one or more control signalings and the capability message.

In some examples of the method, apparatuses, and non-transitory computer-readable medium described herein, the one or more control signalings indicate the first downlink message and the second downlink message may be not overlapping in time and the first downlink message and the second downlink message each correspond to different TCI states and the method, apparatuses, and non-transitory computer-readable medium may include further operations, features, means, or instructions for transmitting, using a first transmit beam corresponding to a first TCI state of the different TCI states, at least a portion of the first downlink message via the first resource allocation based on the one or more control signalings and the capability message and transmitting, using a second transmit beam corresponding to a second TCI state of the different TCI states, at least a portion of the second downlink message via the second resource allocation based on the one or more control signalings and the capability message.

DETAILED DESCRIPTION

Figure 1:
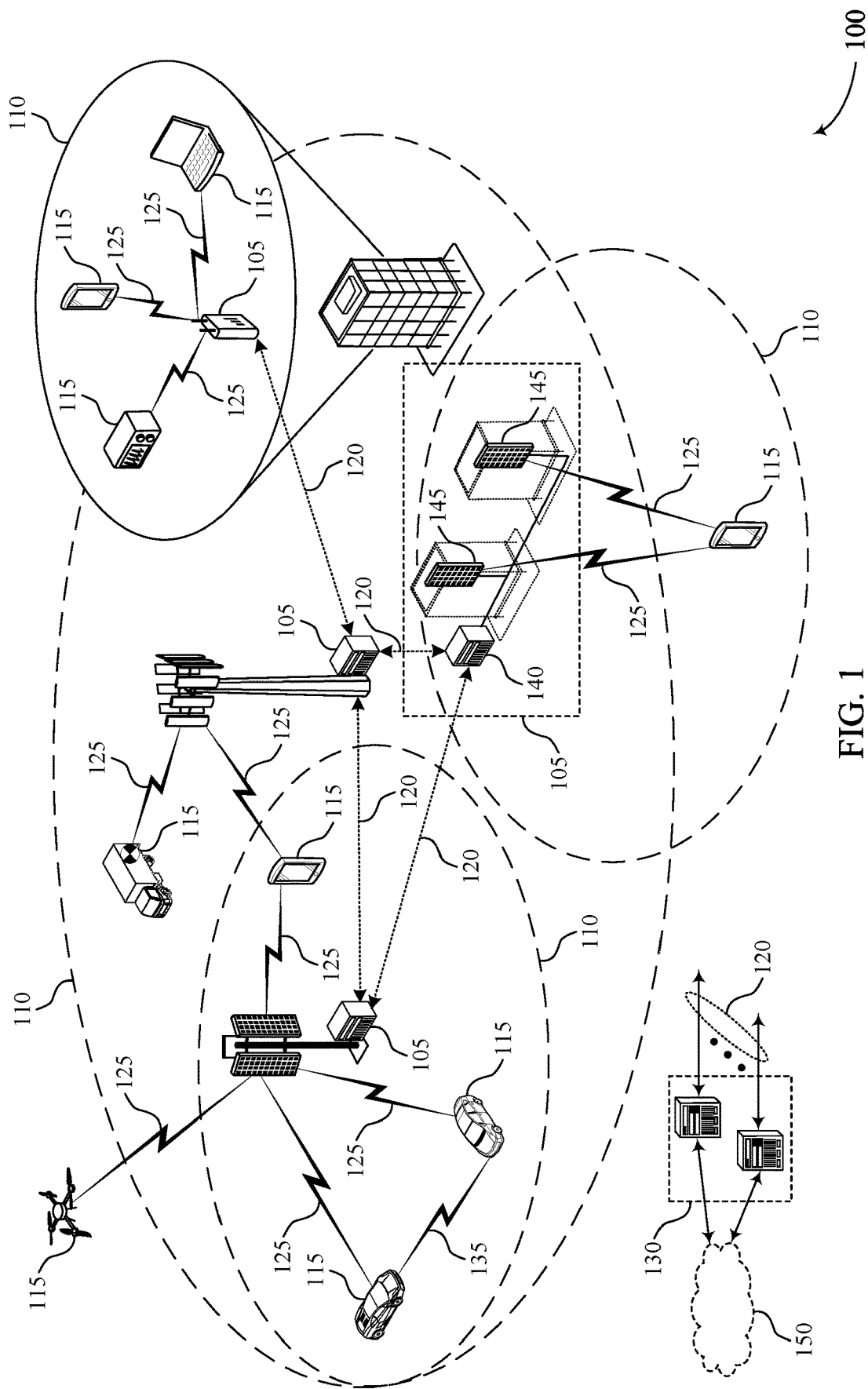
FIG. 1 illustrates an example of a wireless communications system that supports operations for overlapping downlink communications with different resource allocations in accordance with aspects of the present disclosure.

In some wireless communications systems, a UE may be configured by a base station with a periodic scheduling configuration (e.g., an SPS configuration, configured grant, dynamic grant) for receiving and transmitting communications (e.g., with the base station, or another UE) periodically. A scheduling configuration may include a number of periodically allocated resources (e.g., time domain resource, frequency domain resources, or both) that may be used for communications with the UE/base station independent of a dynamic grant. In some examples, the UE may be configured with more than one periodic scheduling configuration. For example, different SPS configurations may have different periodicities and differently sized time domain resource allocations (TDRAs), thus it is possible that two SPS configurations may each schedule a downlink data channel (e.g., physical downlink shared channel (PDSCH)) in a same slot that overlap or at least partially overlap in time. In some examples, two downlink data channels may overlap when the associated start length indicator values overlap. In some examples, two downlink data channels may be considered to be overlapping when at least one of following conditions are met: 1) the associated SLIV values cause the resources to overlap in time or the associated SLIVs do not cause the resources to overlap in time, but the two downlink data channels are associated with different TCIs and a TCI switching gap between two SLIVs is below a threshold duration used to switch between TCI states.

Thus, methods for managing reception of (or in some examples, transmitting feedback for) overlapping PDSCHs associated with different scheduling configurations may increase efficiency of communications at the UE.

In some examples, the UE may be capable of receiving a single downlink data channel in a time slot. For example, when the UE may receive a single downlink data channel per time slot, and when a number of downlink data channels scheduled by different scheduling configurations are scheduled for a same time slot, the UE may receive one downlink data channel and may prune the other one or more overlapping data channels based on one or more characteristics of the downlink data channels or the associated scheduling configurations, or both including one or more of: a number of bits carried by the downlink data channels, a repetition factor k of the downlink data channel, a priority of the downlink data channels, or MCS values associated with the downlink data channels or the associated scheduling configurations, or any combination thereof.

In some such examples, the UE may select a largest resource allocation out of the resource allocations assigned to all overlapping downlink data channels and may receive a downlink data channel based on a MCS value of the associated scheduling configuration or based on one or more of the examples described herein. In some examples, the UE may receive the downlink data channel using the scheduling configuration having a higher MCS, or in some examples, a lower MCS. That is, the UE may receive a downlink data channel via a resource allocation previously assigned to another downlink data channel, where the downlink data channel to be received is selected based on one or more characteristics of the downlink data channel or the associated scheduling configuration.

In some examples, the UE may select a largest usable union of resources of all overlapping downlink data channel resources allocations assigned to the overlapping downlink data channels and may receive a single downlink data channel via the largest usable union of downlink data channel resources based on an MCS value of the associated scheduling configuration or based on one or more of the examples described herein, In some examples, the UE may receive the downlink data channel using the scheduling configuration having a higher MCS, or in some examples, a lower MCS. That is, the UE may receive a downlink data channel via a union of resources previously at least partially assigned to another downlink data channel, where the downlink data channel to be received is selected based on one or more characteristics of the downlink data channel or the associated scheduling configuration.

In some other examples, the UE may be capable of receiving multiple downlink data channels in a slot. For example, the UE may be capable of receiving multiple downlink data channels in a time slot and when two downlink data channels from different scheduling configurations are scheduled during a same time slot, a beam switching gap may be considered. For example, if two downlink data channels may be received using a same communication beam, the UE may receive both downlink data channels. However, if two downlink data channels belong to scheduling configurations associated with different communication beams and are scheduled in a time slot, both downlink data channels may be received, but, in some examples, one downlink data channel may be partially received or not received if a time gap between the associated allocated time is not long enough to perform a beam switching procedure. In some examples, the UE may switch one of the downlink data channels to having a same beam configuration as the other overlapping downlink data channel so that the two downlink data channels may be received using a same communication beam (e.g., without preforming a beam switching procedure).

In the examples described herein, the UE may be configured to efficiently receive overlapping-downlink data channels and may mitigate receiving errors for higher spectral efficiency of communications at the UE.

Aspects of the disclosure are initially described in the context of wireless communications systems. Aspects of the disclosure are further described in the context of a resource schedule, a resource configuration, and a process flow. Aspects of the disclosure are further illustrated by and described with reference to apparatus diagrams, system diagrams, and flowcharts that relate to operations for overlapping downlink communications with different resource allocations.

FIG. 1 illustrates an example of a wireless communications system 100 that supports operations for overlapping downlink communications with different resource allocations in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 may transmit, to a base station 105, a capability message indicating a capability of the UE 115 to receive one or more downlink messages during a time slot, and may receive one or more control signalings which schedule a first and a second downlink message during the time slot. The UE 115 may indicate a first resource allocation scheduled by a first scheduling configuration, and indicate a second resource allocation scheduled by a second scheduling configuration. The UE 115 may monitor for one or both of the first downlink message and the second downlink message during the time slot based on the one or more control signalings and the capability message. The capability message may indicate a capability of the UE to receive a single downlink message or to receive more than one downlink message during the time slot.

Figure 2:
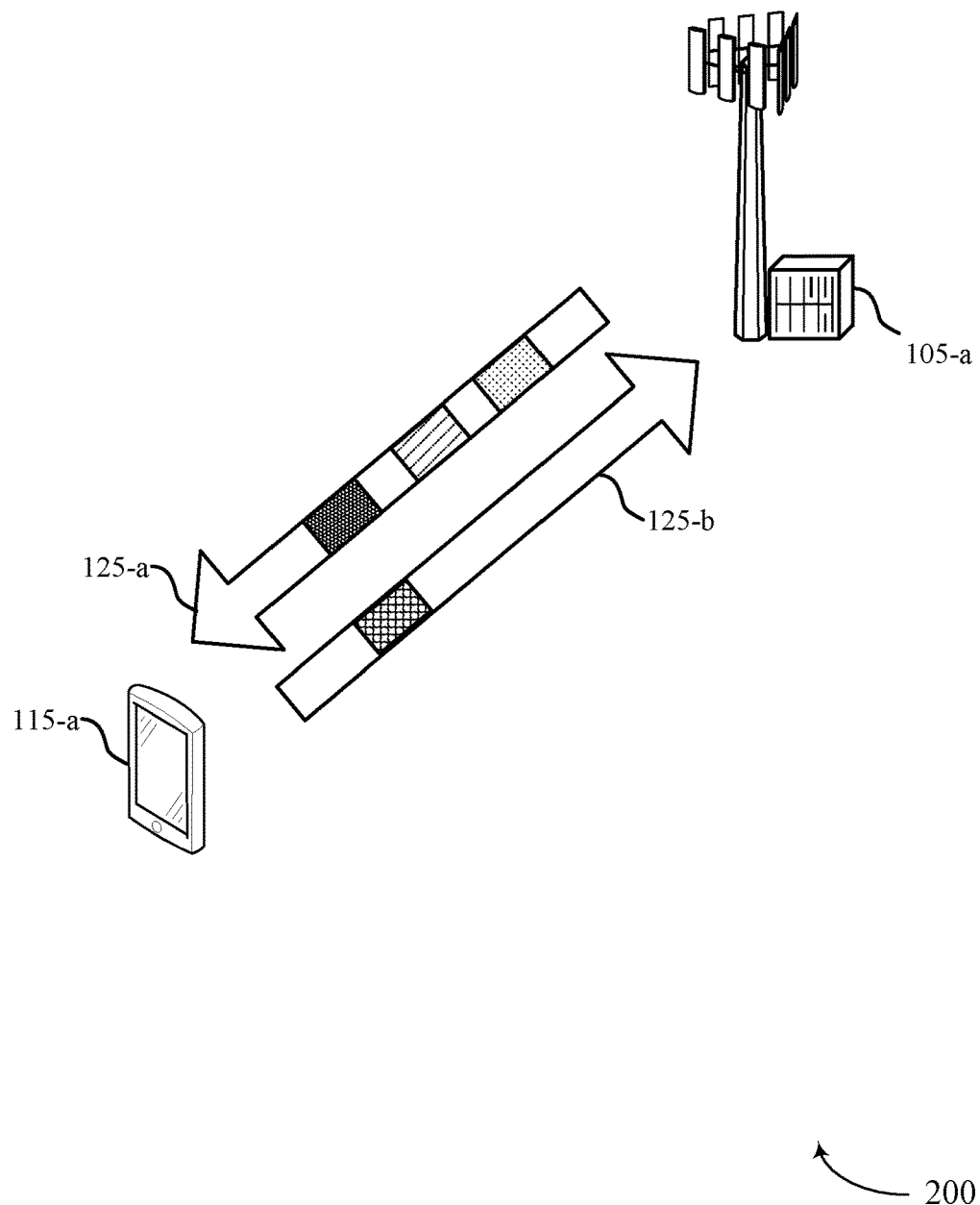
FIG. 2 illustrates an example of a wireless communications system that supports operations for overlapping downlink communications with different resource allocations in accordance with aspects of the present disclosure.

FIG. 2 illustrates an example of a wireless communications system 200 that supports operations for overlapping downlink communications with different resource allocations in accordance with aspects of the present disclosure. For example, the wireless communications system 200 may include a base station 105-a and UE 115-a, which may be examples of a base station 105 and a UE 115 as described with reference to FIG. 1, respectively. In some examples, the base station 105-a and UE 115-a may communicate over communication links 125-a and 125-b, which may be examples of a communication link 125 as described with reference to FIG. 1.

In some example, the UE 115-a may be configured with an SPS configuration which may enable the UE 115-a to receive downlink data (e.g., PDSCH) independently from a dynamic grant. That is, the UE 115-a may receive communications from the base station 105-a without a dynamic grant. For example, the UE 115-a may not need a dynamic grant to receive data from the base station 105-a and may thus decrease control overhead signaling while communicating with the base station 105-a. An SPS configuration may be more efficient for some types of traffic (e.g., periodic traffic), such as voice traffic than some other types of traffic.

In some examples, the UE 115-*a* may be configured with more than one SPS configuration, each indexed by a different index value (e.g., different sps-ConfigIndex values). Different SPSs may have different periodicities of allocated resources and different TDRA table entries (e.g., specifying a length of the TDRA). Thus, it may be possible that two SPS configurations schedule two PDSCHs in a same time slot or schedule two overlapping PDSCHs based on an SLIV associated with each PDSCH. In such examples, the UE 115-*a* may determine which PDSCH(s) to receive and for which to transmit feedback. A first PDSCH may overlap with another PDSCH based on a start time and time resource length (e.g., number of symbols or duration) of each PDSCH (e.g., based on the associated SLIV value). Conventionally, if two PDSCH resources are overlapping in or scheduled for a same time slot, the PDSCH scheduled by the SPS having a lower index value (e.g., sps-ConfigIndex) is received while the other is pruned (e.g., flushed, rescheduled). That is, the UE 115-*a* may monitor for the PDSCH scheduled by the lower index SPS to avoid collision of the PDSCHs. In some examples, a first configured grant may overlap with a second configured grant for transmitting a physical uplink shared channel (PUSCH) and the UE 115-*a* may determine to prioritize one of the CGs based on a UE implementation (e.g., configuration of the UE, MAC multiplexing). In such examples, the base station 105-*a* may blindly decode a PUSCH received from the UE 115-*a*.

When a first PDSCH scheduled by a first SPS having a lower index value overlaps in a time slot with a second PDSCH scheduled by a second SPS having a higher index values, conventionally, the first PDSCH may be received (e.g., monitored for or selected), but receiving the first PDSCH may be inefficient in examples when the second PDSCH carries more data or has a higher priority, or when the base station 105-*a* transmits the first PDSCH using resources scheduled for the first PDSCH even though the second SPS configuration scheduled a greater number of resources for the second PDSCH than the first SPS configuration, or vice versa, (e.g., because both set of resources are reserved for the UE), or when the UE is capable of receiving two PDSCHs in a time slot.

In some examples, the first SPS may collide (e.g., overlap) with the second SPS configuration, and improved handling of such overlap may increase efficiency, especially in mmW communications systems. The base station 105-*a* may serve multiple UEs simultaneously if they can be communicated with using a same communication beam configuration. That is, resources reserved for one UE may be difficult to reuse for another UE associated with a different communication beam configuration. Thus, it may be more efficient to maximize utilization of the resources allocated to a UE during the time slot.

In some wireless communications systems, two PDSCHs may be considered to overlap when their associated SLIVs overlap. In some wireless communications system such as mmW band communications systems, even though two PDSCHs do not have overlapping SLIVs, when the first PDSCH is associated with a first TCI state and the second PDSCH is associated with a second TCI state, thus requiring the UE to switch TCI states and if there may be insufficient time for a TCI switching process (e.g., a TCI switching gap between the two SLIVs may be small), these two PDSCHs may be considered to overlap despite having disjointed SLIV values relative to each other.

However, there may be alternative implementations that more efficiently utilize resources for receiving overlapping PDSCHs.

For example, the UE 115-*a* may transmit, to the base station 105-*b*, a capability message indicating a capability of the UE 115-*a* to receive one or more downlink messages during a time slot, and may receive control signaling 225 which schedules a first and a second downlink message during the time slot. The control signaling 225 may further indicate a first resource allocation scheduled by a first SPS configuration, and indicate a second resource allocation scheduled by a second SPS configuration. The UE 115-*a* may monitor for one or both of the first downlink message 230-*a* or the second downlink message 230-*b* during the time slot based on the control signaling 225 and the capability message 220. The capability message 220 may indicate a capability of the UE to receive a single downlink message or to receive more than one downlink message during the time slot. In some examples, the UE 115-*a* may singly receive the first downlink message 230-*a* based on a capability to receive a single PDSCH in a time slot or may additionally receive at least a portion of the second downlink message 230-*b* based on a capability to receive more than one PDSCH in a time slot.

Figure 3:
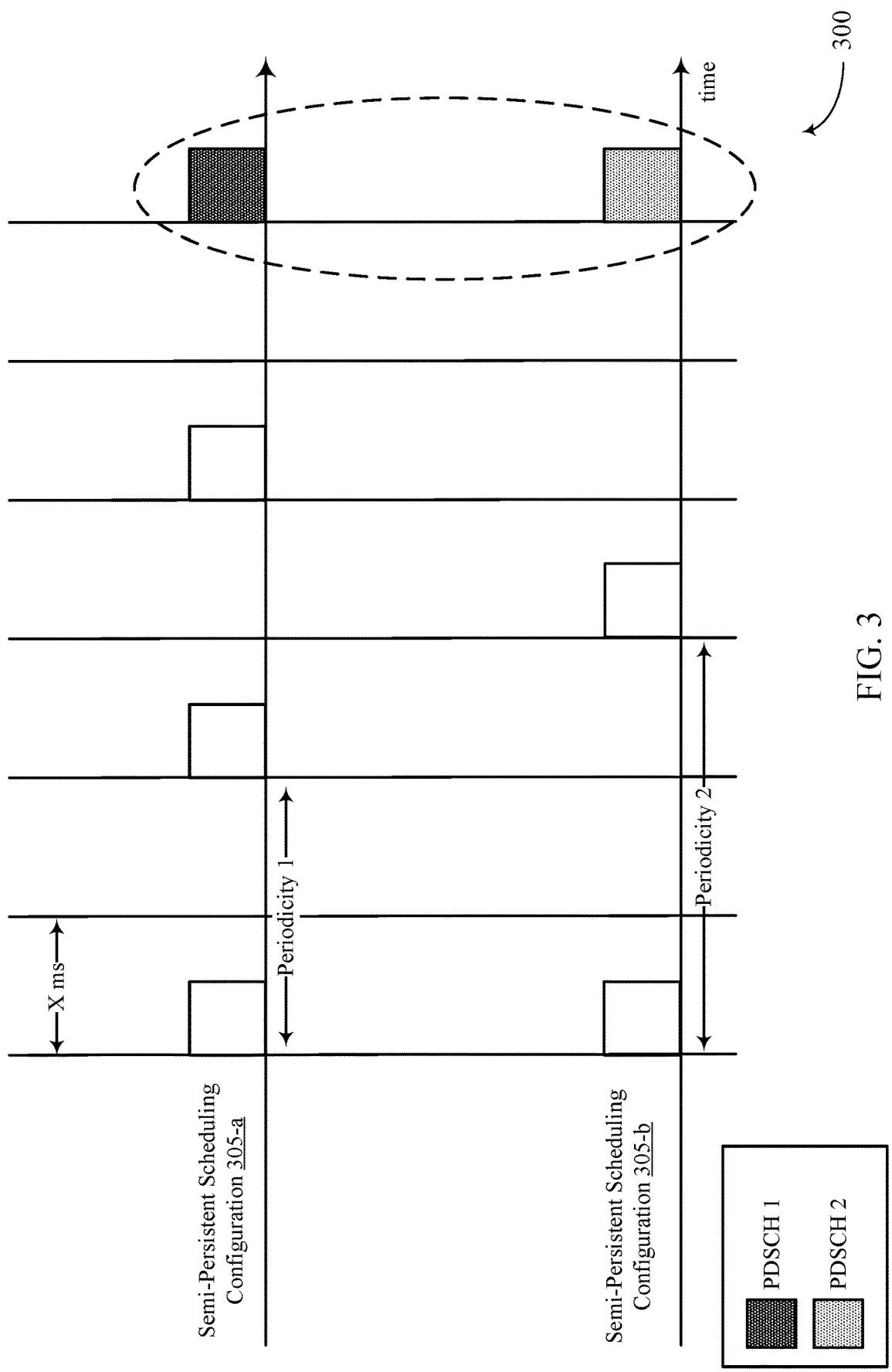
FIG. 3 illustrates an example of a resource schedule that supports operations for overlapping downlink communications with different resource allocations in accordance with aspects of the present disclosure.

FIG. 3 illustrates an example of a resource schedule 300 that supports operations for overlapping downlink communications with different resource allocations in accordance with aspects of the present disclosure. Aspects of the resource schedule 300 may be implemented by a base station 105-*a* and a UE 115-*a* as described with reference to FIG. 2. The resource schedule may include a first SPS configuration 305-*a* which schedules a first PDSCH (e.g., PDSCH 1) and a second SPS configuration 305-*b* which schedules a second PDSCH (e.g., PDSCH 2).

The SPS configurations 305-*a* and 305-*b* may enable the UE 115-*a* to receive data (e.g., PDSCH 1 or PDSCH 2, or both) independently from a dynamic grant. For example, the UE may be configured with SPS configuration 305-*a* or 305-*b*, or both and may not need a dynamic grant to receive data from the base station 105-*b* and may thus decrease control overhead signaling. SPS configurations may be more efficient for some types of traffic (e.g., periodic traffic), such as voice traffic.

In some examples, the UE 115-*a* may be capable of receiving a single PDSCH (e.g., PDSCH1 or PDSCH 2) per time slot and the PDSCH 1 and the PDSCH 2 may be scheduled for a same time slot, the UE 115-*a* may prune (e.g., cancel, reschedule, flush) one of the PDSCHs (e.g., PDSCH1 or PDSCH 2). For example, the UE 115-*a* may select or prioritize one of the SPS configuration 305-*a* or SPS configuration 305-*b* based on number of bits to be carried in the PDSCH 1 or PDSCH 2. In some examples, the UE 115-*a* may receive and prune the PDSCH 1 and PDSCH 2 based on an associated transport block (TB) size (e.g., information bits before coding) or may select and prune the PDSCH 1 and PDSCH 2 based on a number of coded bits (e.g., RE*Modulation Order*Layer) of the PDSCH 1 and the PDSCH 2 (e.g., receive the PDSCH having the larger or smaller number of bits or coded bits, and skip receiving the other) or may receive the PDSCH (e.g., PDSCH1 or PDSCH 2) having the smaller repetition factor (e.g., k) and may prune the other PDSCH (e.g., having a larger repetition factor). For example, it may be more impactful to remove one repetition of a PDSCH having smaller repetition factor (e.g., k). That is, pruning the PDSCH having a larger repetition factor may have a smaller effect on communications reliability at the UE 115-*a*. In some examples, the UE 115-*a* may receive the PDSCH 1 or PDSCH 2 having a relatively higher priority and may prune the other PDSCH (e.g., having a lower priority). In some examples, the PDSCHs may have a same priority and the UE 115-*a* may receive the PDSCH having the lower index value. In some examples, the UE 115-*a* may receive the PDSCH having a lower MCS value. For example, a lower MCS index value may indicate that the corresponding data may be transmitted with higher reliability and thus the UE 115-*a* may receive the PDSCH data intended to have the higher reliability transmission.

In some examples, the UE 115-*a* may receive a single PDSCH (e.g., PDSCH 1 or PDSCH 2) based on the described criteria but may rely on receiving a relatively lower index SPS in case of a tie (a same MCS, a same priority, a same number of bits, etc.).

In some examples, based on the scheduled overlap between PDSCH 1 and PDSCH 2, the UE 115-*a* may select a set of resources for receiving a PDSCH out of the two sets of resources allocated to the PDSCH 1 and PDSCH 2 to increase the number of utilized resources. The UE 115-*a* may receive the PDSCH 1 or PDSCH 2 using the selected set of resources such that, in some examples, the UE may receive one of the PDSCH 1 or 2 via a resource allocation previously assigned to the other PDSCH.

For example, when the UE 115-*a* is capable of receiving a single PDSCH per time slot, and the PDSCH 1 and PDSCH 2 are scheduled for a same time slot, the UE 115-*a* may receive a PDSCH via a larger resource allocation out of the resource allocations assigned to PDSCH 1 and PDSCH 2 (e.g., a resource rectangle defined by an FDRA in one dimension and SLIV in a second dimension). In some examples, the UE 115-*a* may receive the PDSCH associated with the SPS having a higher MCS, or in some examples, a lower MCS using the selected resource allocation. That is, in some examples, the UE 115-*a* may receive PDSCH 1 via a resource allocation previously assigned to PDSCH 2, or vice versa. For example, the UE 115-*a* may receive the selected PDSCH 1 via the resource allocation previously assigned to PDSCH 2 and using the initial TB size of the PDSCH 1 or may re-calculate the TB size of the PDSCH 1 based on the resource allocation of PDSCH 2. In some examples, the UE 115-*a* may receive the PDSCH 1 using the original TB size when the PDSCH 1 is a repetition of a number of repetitions and may otherwise recalculate the TB size for receiving the PDSCH 1 over the new resource allocation.

When the UE 115-*a* receives a PDSCH over a larger resource allocation regardless of whether the resource allocation was originally allocated to the PDSCH or another PDSCH, the UE 115-*a* may communicate with increased throughput relative to some other implementations.

Additionally, or alternatively, when two PDSCHs overlap in the time domain, the UE 115-*a* may try to use a union of resources from all overlapping PDSCHs for receiving one of the PDSCH. In other words, the total set of resources available to the UE 115-*a* may be a combination of resources from multiple resource allocations for different PDSCHs, or different SPS configurations. For example, when PDSCH 1 and PDSCH 2 are scheduled for a same time slot and overlap in the time domain or the frequency domain, or both, the UE 115-*a* may try to use a union of resources allocated to PDSCH 1 and PDSCH 2 for receiving the PDSCH 1.

The UE 115-*a* may be capable of receiving a single PDSCH per time slot, and PDSCH 1 and PDSCH 2 are scheduled for a same time slot, the UE 115-*a* may receive one of the PDSCH 1 or PDSCH 2 via a set of resources determined by calculating a set of usable resources (e.g., a largest possible resource rectangle) out of the union of the resource allocations associated with each of the PDSCH 1 and PDSCH 2 and choosing the PDSCH associated with the SPS configuration 305 having the higher MCS, or in some examples, the lower MCS. In such examples, a demodulation reference signal associated with received the PDSCH may be based on the determined union of resources.

For example, the UE 115-*a* may receive the selected PDSCH (e.g., PDSCH 1) via a portion of the resource allocation previously assigned to PDSCH 1 and a portion of the resource allocation previously assigned to PDSCH 2, using the initial TB size of the PDSCH 1, or using a re-calculated TB size of the PDSCH 1 based on the new resource allocation including the union of portions of resources. In some examples, the UE 115-*a* may receive the PDSCH using the original TB size when PDSCH 1 is a repetition and may otherwise recalculate the TB size for receiving PDSCH 1 over the new resource allocation including the union of resources.

In some examples, the UE 115-*a* may be capable of receiving two PDSCHs (e.g., two TDM-ed PDSCHs) in one time slot. However, if the PDSCH 1 and the PDSCH 2 are each associated with a different beam configuration (e.g., different beams for reception, different TCI states), the UE 115-*a* may perform a beam switching procedure between receiving PDSCH 1 and PDSCH 2 which may be performed over a period of time and may be referred to as a switching gap in which the UE 115-*a* neither receives nor transmits communications. This may be especially true in wireless communications systems that support beamforming, or mmW communications, or both. In some examples, the UE 115-*a* may receive RRC signaling that configures the switching gap based on a capability of the UE 115-*a* reported (e.g., signaled) to the base station 105-*a*.

In some examples, each SPS configuration 305 may be assigned to a group, where each SPS configuration of a group has a same beam configuration (e.g., TCI state). That is, SPS configurations 305-*a* and 305-*b* may belong to a same group and may have a same beam configuration or may be assigned to different groups and may have different beam configurations.

The UE 115-*a* may be capable of receiving multiple PDSCHs (e.g., TDM-ed PDSCHs) in one time slot and the PDSCH 1 and PDSCH 2 may be time-division multiplexed in a same slot, and may take the beam switching gap into consideration when determining which, if not both of the PDSCHs, to receive.

For example, when the SPS configuration 305-*a* and SPS configuration 305-*b* belong to a same group, both PDSCHs may be received regardless of the beam switching gap configuration. However, when SPS configuration 305-*a* and SPS configuration 305-*b* belong to different groups, the UE 115-*a* may receive both PDSCH 1 and PDSCH 2, but one PDSCH may be partially received if a time gap between the end time of the TDRA of PDSCH 1 and the start time of the TDRA of PDSCH 2 is smaller than the beam switching gap. In some examples, the UE 115-*a* may receive both PDSCHs by switching a beam configuration of one of the PDSCH to match the beam configuration of the other which may eliminate the effects caused by beam switching.

The examples described herein may be combined to manage relatively larger numbers of PDSCH schedule for a same time slot. For example, a first PDSCH and a second PDSCH may overlap in time, and a third PDSCH may be scheduled for one or more later symbols of the time slot (e.g., the third PDSCH may be TDM-ed with the overlapping first and second PDSCH), and any of the previous options may be used to manage the overlapping first and second PDSCH and the UE 115-a may implement one or more of the methods used for managing two or more TDMed PDSCHs to manage the third PDSCH and the surviving PDSCH out of the first and second PDSCH. That is, the UE 115-a may prune one of a number of overlapping PDSCHs while receiving a second PDSCH TDM-ed with the surviving PDSCH.

In some examples, two PDSCHs associated with SPSs in different groups may be scheduled for different slots (e.g., consecutive slots) and the UE 115-a may perform a beam switching procedure during a beam switching gap to receive both PDSCH. For example, PDSCH 1 may be scheduled by SPS configuration 305-a (e.g., belonging to a first group) during all symbols of a first slot and PDSCH 2 may be scheduled by SPS configuration 305-b (belonging to a different group) during all of the symbols of a second slot subsequent to the first slot (e.g., right after the first slot). In such examples, PDSCH 1 and PDSCH 2 may be associated with different TCI states. The UE 115-a may perform a beam switching procedure during a symbol but in the example described herein, there may be no symbols that occur between the scheduled ending symbol of PDSCH 1 and the starting symbol of PDSCH 2. In such cases, the PDSCH 1 and PDSCH 2 may be considered to be overlapping and may be managed using any of the examples described herein for receiving two PDSCHs in a same time slot.

Figure 4A:
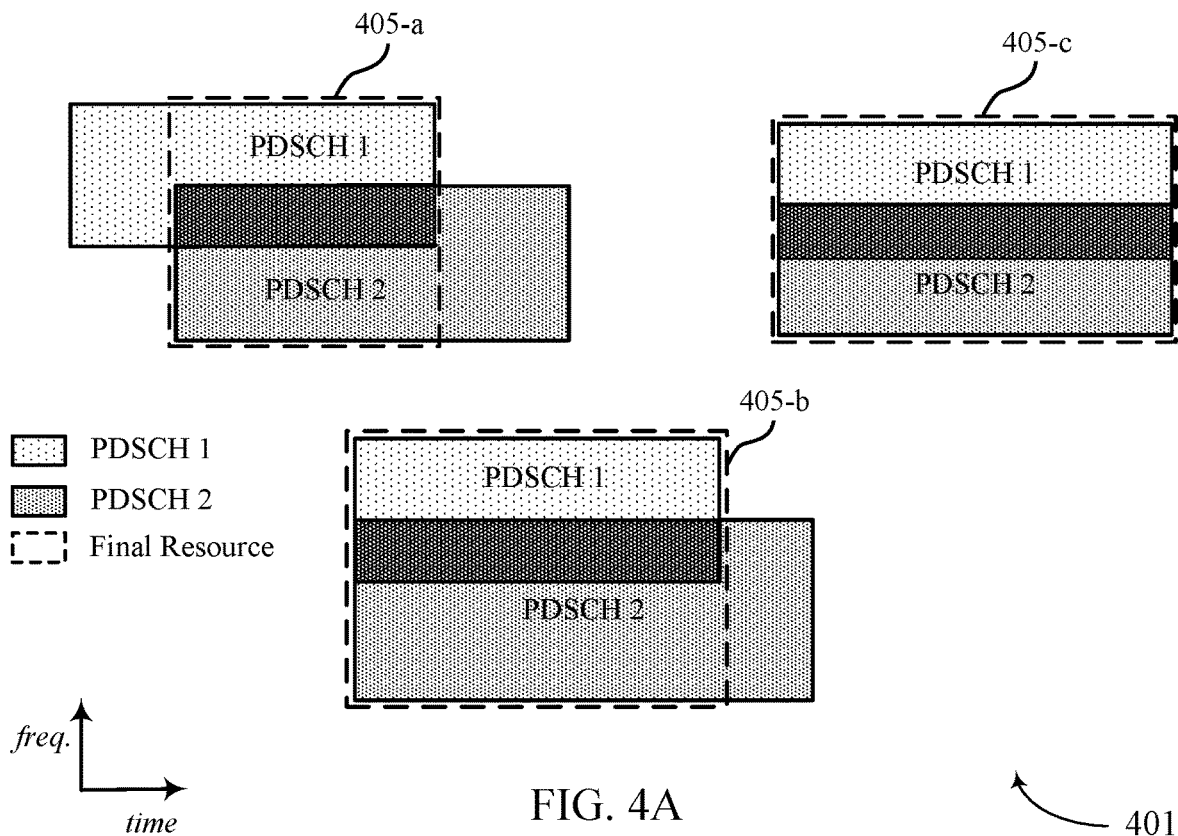
FIGS. 4A & 4B illustrates an example of a resource configuration that supports operations for overlapping downlink communications with different resource allocations in accordance with aspects of the present disclosure.
Figure 4B:
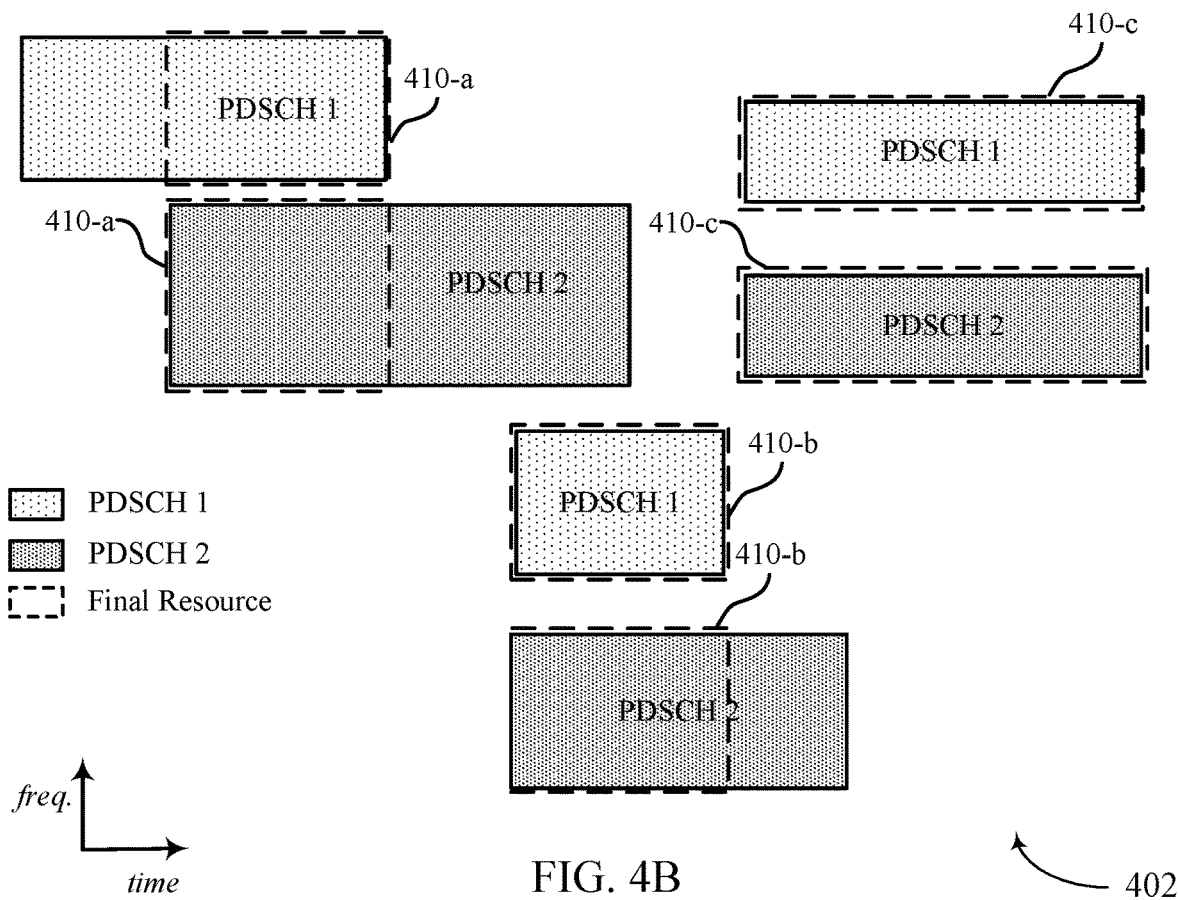

FIGS. 4A & 4B illustrate an example of a resource configuration 401 & 402, respectively, that each support operations for overlapping downlink communications with different resource allocations in accordance with aspects of the present disclosure.

The resource configuration 401 may include various examples of calculating a set of usable resources out of a union of resources when resources allocated to a first PDSCH (e.g., PDSCH 1) overlaps in frequency and time with resources allocated to a second PDSCH.

In a first example, PDSCH 1 and PDSCH 2 may be scheduled by respective SPS configurations during a same time slot. For example, PDSCH 1 may be scheduled by an SPS during a set of time domain symbols that partially overlap with a set of time domain symbols scheduled for the PDSCH 2 and an FDRA of PDSCH 1 may partially overlap with an FDRA of PDSCH 2. In such examples, a first union of resources 405-a may include the resources of both PDSCH 1 and PDSCH 2 in the frequency domain and the overlapping symbols in the time domain, as indicated by the dashed resource rectangle with dashed side lines. That is, the UE 115-a may receive PDSCH 1 or PDSCH 2 via the first union of resources 405-a including the FDRA of PDSCH 1 and the FDRA of PDSCH 2 during the overlapping symbols.

In a second example, PDSCH 1 and PDSCH 2 may be scheduled by respective SPS configurations during a same time slot. For example, PDSCH 1 may be scheduled by an SPS during a set of time domain symbols that are overlapped by a set of time domain symbols scheduled for the PDSCH 2 and an FDRA of PDSCH 1 may partially overlap with an FDRA of PDSCH 2. In such examples, a second union of resources 405-b may include the resources of both PDSCH 1 and PDSCH 2 in the frequency domain and the overlapping symbols in the time domain. That is, the UE 115-a may receive PDSCH 1 or PDSCH 2 via the second union of resources 405-b including the FDRA of PDSCH 1 and the FDRA of PDSCH 2 during time domain symbols corresponding to the time domain symbols allocated to PDSCH 1 and partially corresponding to the time domain symbols allocated to PDSCH 2 by their respective SPS configurations.

In a third example, PDSCH 1 and PDSCH 2 may be scheduled by respective SPS configurations during a same time slot. For example, PDSCH 1 may be scheduled by an SPS during a set of time domain symbols that are the same as a set of time domain symbols scheduled for the PDSCH 2 and an FDRA of PDSCH 1 may partially overlap with an FDRA of PDSCH 2. In such examples, a third union of resources 405-c may include the resources of PDSCH 1 and PDSCH 2 in the frequency domain and the overlapping symbols in the time domain. That is, the UE 115-a may receive PDSCH 1 or PDSCH 2 via the third union of resources 405-c including the FDRA of PDSCH 1 and the FDRA of PDSCH 2 during the symbols corresponding to the time resources allocated to both the PDSCH 1 and PDSCH 2 by their respective SPS configurations.

In each of the three examples of resource configuration 401, the UE 115-a may receive one of the PDSCH 1 or 2 using a set of frequency resources not smaller than the FDRA originally allocated to the received PDSCH.

The resource configuration 402 may include various examples of a union of resources with a first FDRA allocated to a first PDSCH (e.g., PDSCH 1) overlaps in time with a second FDRA allocated to a second PDSCH. In some examples, the frequency domain allocation of the first FDRA may be non-overlapping with the frequency domain allocation of the second FDRA.

In a first example, PDSCH 1 and PDSCH 2 may be scheduled by respective SPS configurations during a same time slot. For example, PDSCH 1 may be scheduled by an SPS during a set of time domain symbols that partially overlap with a set of time domain symbols scheduled for the PDSCH 2 and an FDRA of PDSCH 1 may be non-overlapping with an FDRA of PDSCH 2 by a set of frequency resources. In such examples, a first union of resources 410-a may include the resources of both PDSCH 1 and PDSCH 2 in the frequency domain, during the partially overlapping time domain symbols. That is, the UE 115-a may receive PDSCH 1 or PDSCH 2 via the first union of resources 410-a including the FDRA of PDSCH 1, the FDRA of PDSCH 2, and the set of frequency resources during the overlapping time resources.

In a second example, PDSCH 1 and PDSCH 2 may be scheduled by respective SPS configurations during a same time slot. For example, PDSCH 1 may be scheduled by an SPS during a set of time resources that are overlapped by a set of time resources scheduled for the PDSCH 2 and an FDRA of PDSCH 1 be non-overlapping with an FDRA of PDSCH 2 by a set of frequency resources. In such examples, a second union of resources 410-b may include the resources of both PDSCH 1 and PDSCH 2 in the frequency domain over the overlapping symbols in the time domain. That is, the UE 115-a may receive PDSCH 1 or PDSCH 2 via the second union of resources 410-b including the FDRA of PDSCH 1, the FDRA of PDSCH 2, during time resources corresponding to the time resources allocated to PDSCH 1 and partially corresponding to the time resources allocated to PDSCH 2 by their respective SPS configurations.

In a third example, PDSCH 1 and PDSCH 2 may be scheduled by respective SPS configurations during a same time slot. For example, PDSCH 1 may be scheduled by an SPS during a set of time resources that are the same as a set of time resources scheduled for the PDSCH 2 and an FDRA of PDSCH 1 be non-overlapping with an FDRA of PDSCH 2 by a set of frequency resources. In such examples, a third union of resources 410-*c* may include the resources of PDSCH 1 and PDSCH 2, over the overlapping time resources. That is, the UE 115-*a* may receive PDSCH 1 or PDSCH 2 via the third union of resources 410-*c* including the FDRA of PDSCH 1, the FDRA of PDSCH 2 during the time resources corresponding to the time resources allocated to both the PDSCH 1 and PDSCH 2 by their respective SPS configurations.

In each of the three examples of resource configuration 402, the UE 115-*a* may receive one of the PDSCH 1 or 2 using a set of frequency resources greater than the FDRA originally allocated to the received PDSCH and greater than the sum of the FDRAs allocated to PDSCH 1 and PDSCH 2.

Figure 5:
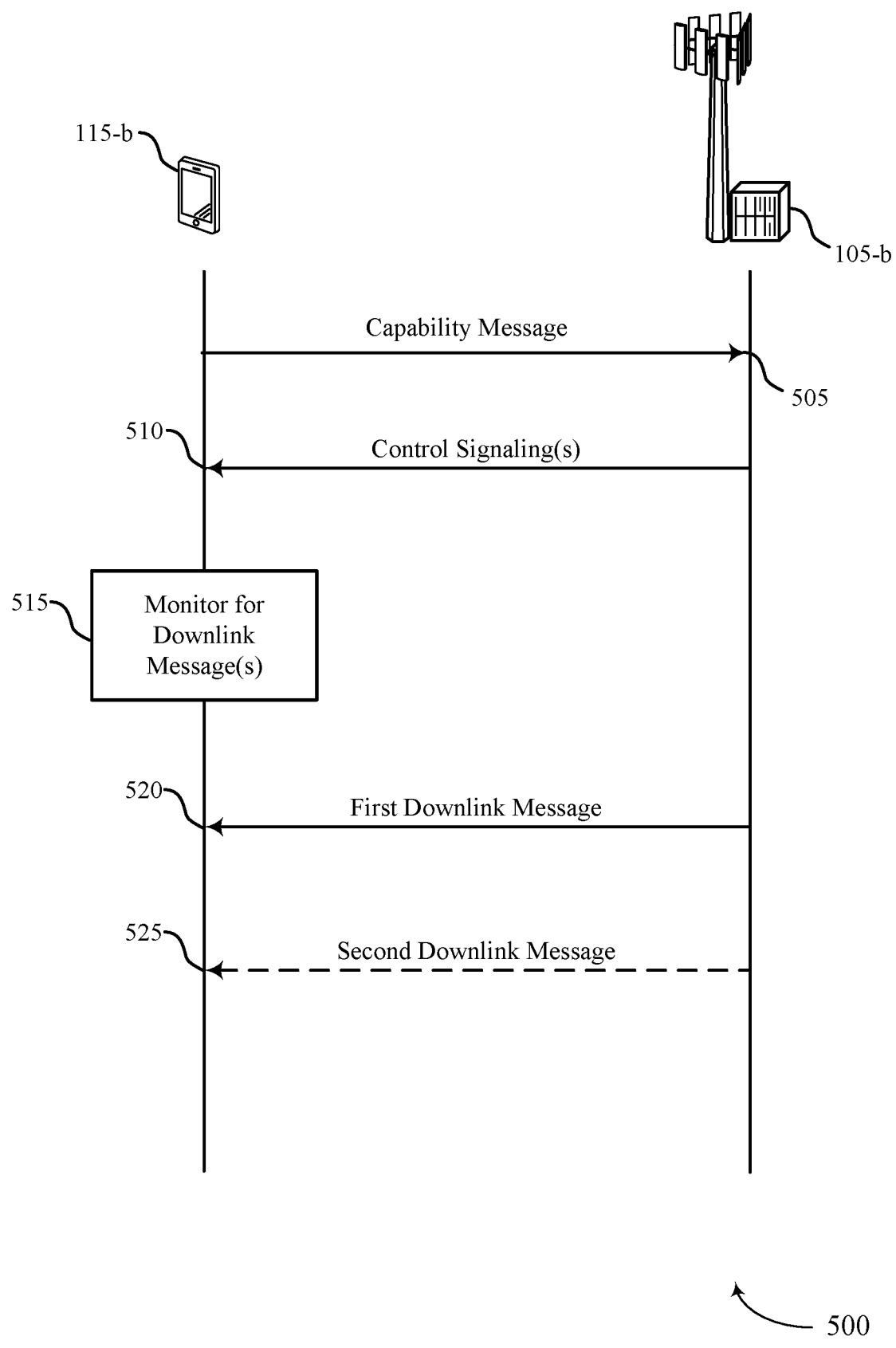
FIG. 5 illustrates an example of a process flow that supports operations for overlapping downlink communications with different resource allocations in accordance with aspects of the present disclosure.

FIG. 5 illustrates an example of a process flow 500 that supports operations for overlapping downlink communications with different resource allocations in accordance with aspects of the present disclosure. The process flow 500 may implement or be implemented by aspects of wireless communications system 100 or 200. For example, the process flow 500 may illustrate operations between a UE 115-*b*, and a base station 105-*b*, which may be examples of the corresponding devices, as described with reference to FIG. 1. In the following description of the process flow 500, the operations between UE 115-*b*, and base station 105-*b* may be transmitted in a different order than the example order shown, or the operations performed by the UE 115-*b*, and the base station 105-*b* may be performed in different orders or at different times or by different devices. Some operations may also be omitted from the process flow 500, and other operations may be added to the process flow 500.

At 505, the UE 115-*b* may transmit a capability message to the base station 105-*b*. In some examples, the capability message may include an indication that the UE is capable of receiving a single PDSCH during a time slot or is capable of receiving multiple PDSCHs during a time slot.

At 510, the base station 105-*b* may transmit control signaling to the UE 115-*b*. For example, the control signalings may schedule a first downlink message (e.g., a first PDSCH) and a second downlink message (e.g., a second PDSCH) during a time slot. Additionally, or alternatively, the control signaling may indicate a first resource allocation scheduled by a first SPS configuration, and may indicate a second resource allocation scheduled by a SPS scheduling configuration.

At 515, the UE 115-*b* may monitoring for one or both of the first PDSCH or the second PDSCH during the time slot based on the first resource allocation scheduled by the first SPS configuration, or the second resource allocation scheduled by the second SPS configuration, or both. In some examples, the UE 115-*b* may monitor for a PDSCH based on a capability of the UE 115-*b* as indicated by the capability message.

At 520, the UE 115-*b* may receive the first downlink message during the time slot. For example, the UE may be capable of receiving a single downlink message during the time slot and may receive the first downlink message based on one or more characteristics of the first PDSCH, the second PDSCH, the first SPS configuration, or the second SPS configuration. In some examples, the UE 115-*b* may receive the first PDSCH over the first resource allocation, the second resource allocation, or a combination of resources from the first and second resource allocations.

In some cases, the UE 115-*b* may be capable of receiving multiple downlink messages during the time slot and at 525, may additionally receive (or partially receive) the second downlink message. For example, the UE 115-*b* may receive the second PDSCH based on one or more characteristics of the first PDSCH, the second PDSCH, the first SPS configuration, the second SPS configuration, TCI states associated with the first PDSCH and the second PDSCH, or a time between resource allocations. For example, if the first PDSCH and the second PDSCH may be received using a same communication beam based on their respective TCI states, the UE 115-*b* may receive both PDSCHs. However, if the first SPS (e.g., scheduling the first PDSCH) is associated with a different communication beam than the second SPS, both downlink data channels may still be received, however, in some examples, the second PDSCH may be partially received or may not be received if the time between the first resource allocation and the second resource allocation is not large enough to perform a beam switching procedure. In some examples, the UE 115-*b* may switch one of the PDSCHs to having a same TCI state as the other so that the first PDSCH and the second PDSCH may be received using a same communication beam (e.g., without preforming a beam switching procedure).

Figure 6:
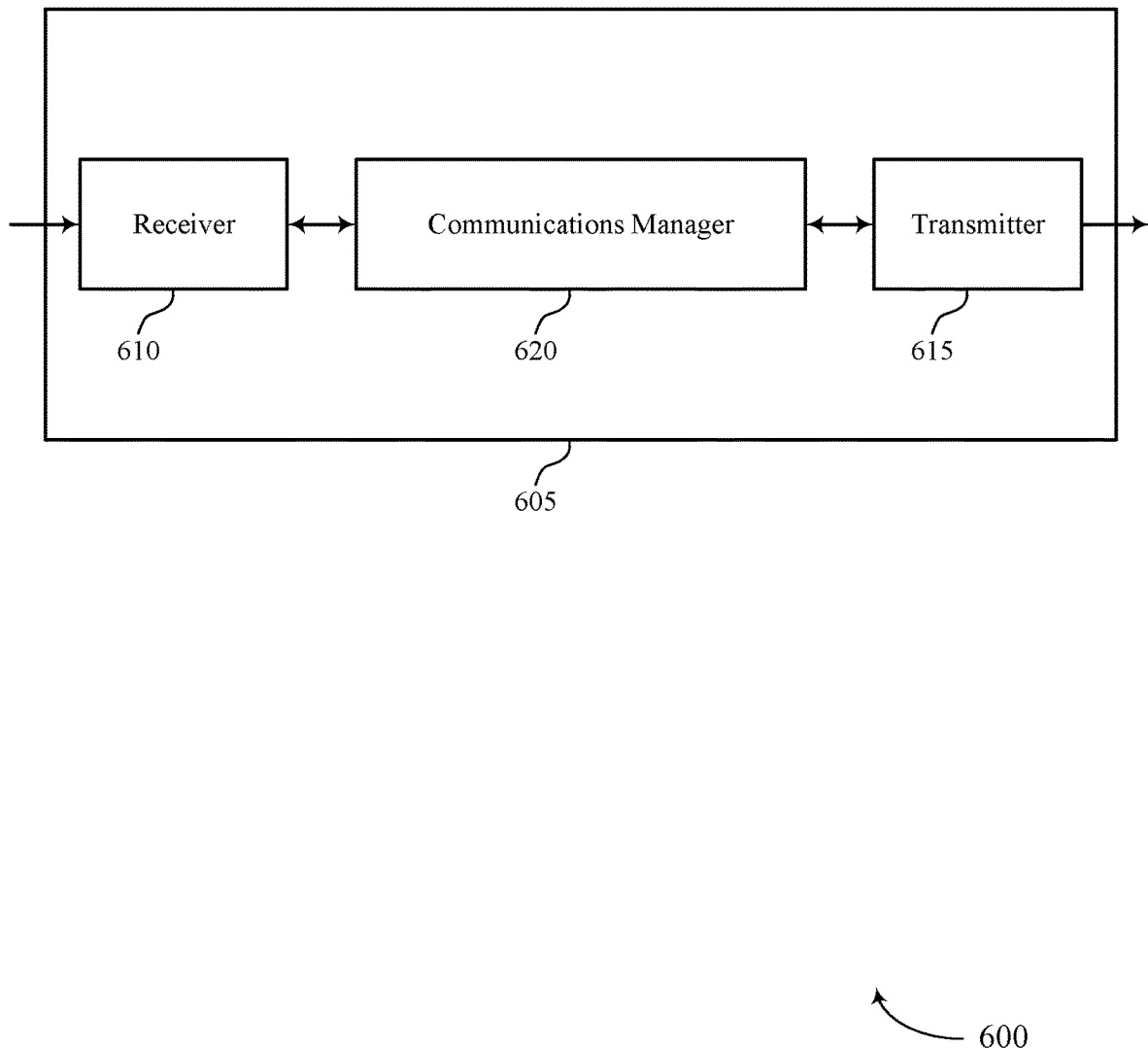
FIGS. 6 and 7 show diagrams of devices that support operations for overlapping downlink communications with different resource allocations in accordance with aspects of the present disclosure.

FIG. 6 shows a diagram 600 of a device 605 that supports operations for overlapping downlink communications with different resource allocations in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to operations for overlapping downlink communications with different resource allocations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to operations for overlapping downlink communications with different resource allocations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of operations for overlapping downlink communications with different resource allocations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting, to a base station, a capability message indicating a capability of the UE to receive one or more downlink messages during a time slot. The communications manager 620 may be configured as or otherwise support a means for receiving, from the base station, one or more control signalings which schedule a first downlink message and a second downlink message during the time slot, indicate a first resource allocation scheduled by a first SPS configuration, and indicate a second resource allocation scheduled by a second SPS configuration. The communications manager 620 may be configured as or otherwise support a means for monitoring for one or both of the first downlink message and the second downlink message during the time slot based on the one or more control signalings and the capability message.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources including higher data rates, increased capacity, and increased spectral efficiency, among other examples.

Figure 7:
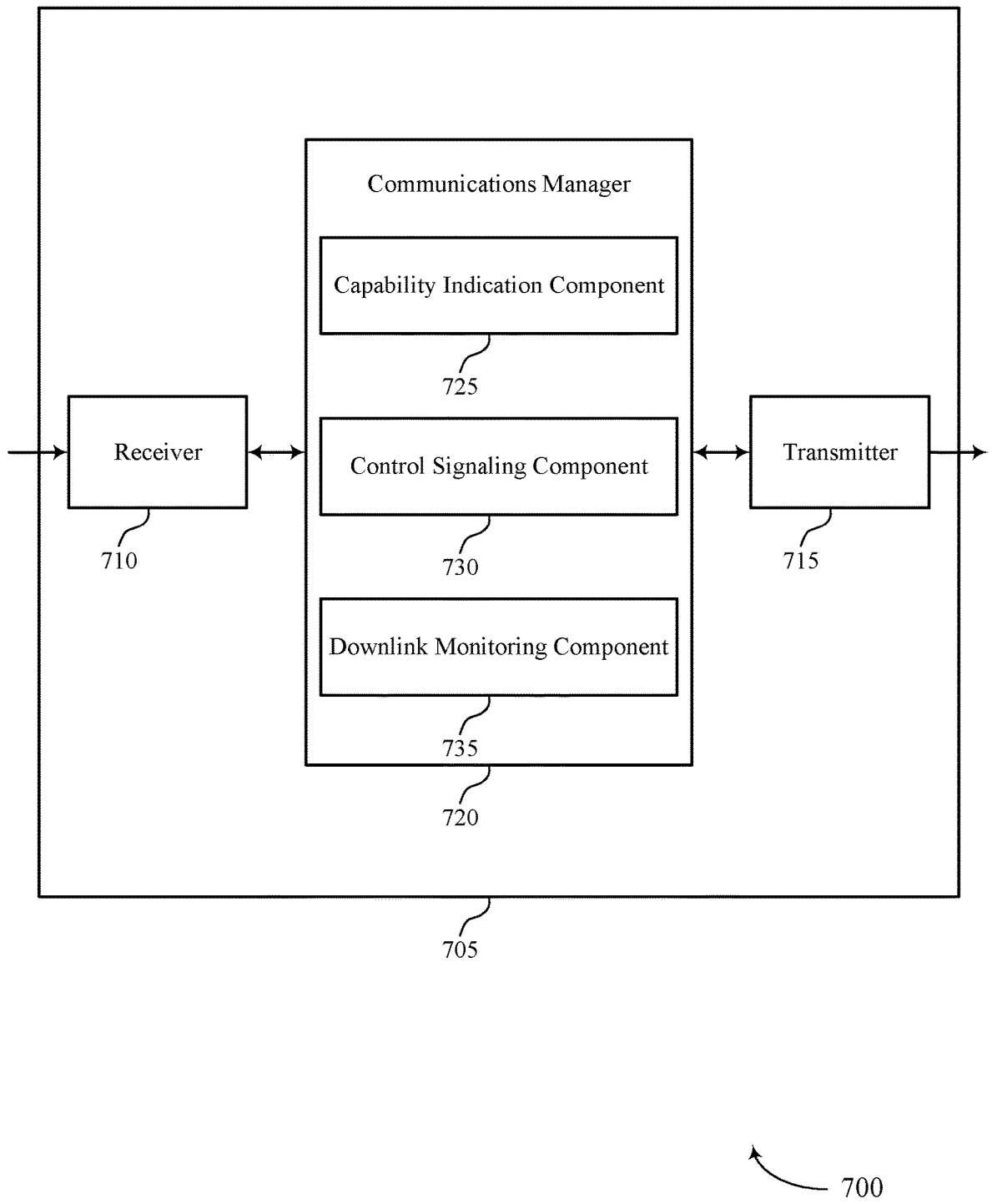

FIG. 7 shows a diagram 700 of a device 705 that supports operations for overlapping downlink communications with different resource allocations in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to operations for overlapping downlink communications with different resource allocations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to operations for overlapping downlink communications with different resource allocations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of operations for overlapping downlink communications with different resource allocations as described herein. For example, the communications manager 720 may include a capability indication component 725, a control signaling component 730, a downlink monitoring component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The capability indication component 725 may be configured as or otherwise support a means for transmitting, to a base station, a capability message indicating a capability of the UE to receive one or more downlink messages during a time slot. The control signaling component 730 may be configured as or otherwise support a means for receiving, from the base station, one or more control signalings which schedule a first downlink message and a second downlink message during the time slot, indicate a first resource allocation scheduled by a first SPS configuration, and indicate a second resource allocation scheduled by a second SPS configuration. The downlink monitoring component 735 may be configured as or otherwise support a means for monitoring for one or both of the first downlink message and the second downlink message during the time slot based on the one or more control signalings and the capability message.

Figure 8:
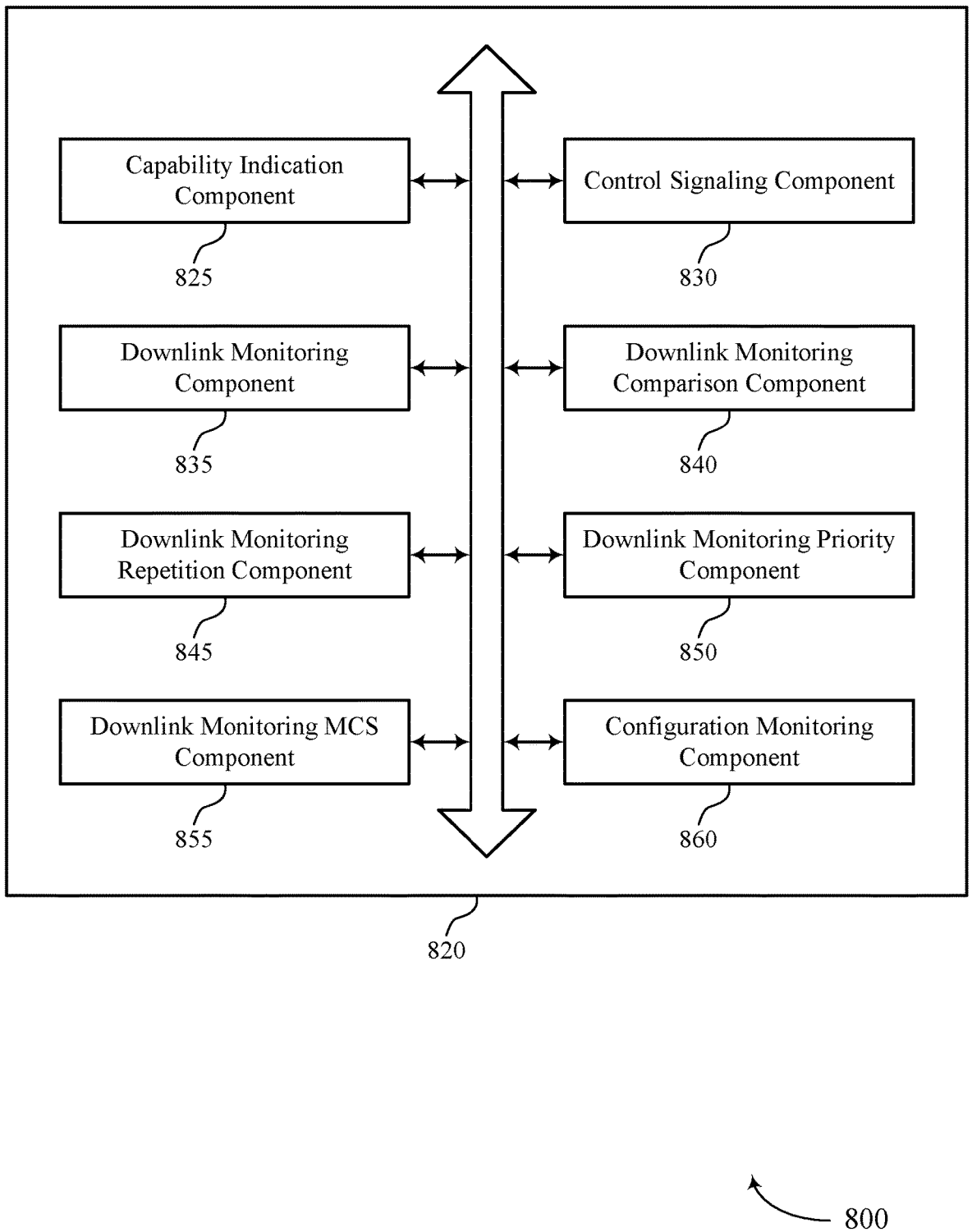
FIG. 8 shows a diagram of a communications manager that supports operations for overlapping downlink communications with different resource allocations in accordance with aspects of the present disclosure.

FIG. 8 shows a diagram 800 of a communications manager 820 that supports operations for overlapping downlink communications with different resource allocations in accordance with aspects of the present disclosure. The communications manager 820 may be an example of aspects of a communications manager 620, a communications manager 720, or both, as described herein. The communications manager 820, or various components thereof, may be an example of means for performing various aspects of operations for overlapping downlink communications with different resource allocations as described herein. For example, the communications manager 820 may include a capability indication component 825, a control signaling component 830, a downlink monitoring component 835, a downlink monitoring comparison component 840, a downlink monitoring repetition component 845, a downlink monitoring priority component 850, a downlink monitoring MCS component 855, a configuration monitoring component 860, or any combination thereof. Each of these components may communicate, directly or indirectly, with one another (e.g., via one or more buses).

The communications manager 820 may support wireless communication at a UE in accordance with examples as disclosed herein. The capability indication component 825 may be configured as or otherwise support a means for transmitting, to a base station, a capability message indicating a capability of the UE to receive one or more downlink messages during a time slot. The control signaling component 830 may be configured as or otherwise support a means for receiving, from the base station, one or more control signalings which schedule a first downlink message and a second downlink message during the time slot, indicate a first resource allocation scheduled by a first SPS configuration, and indicate a second resource allocation scheduled by a second SPS configuration. The downlink monitoring component 835 may be configured as or otherwise support a means for monitoring for one or both of the first downlink message and the second downlink message during the time slot based on the one or more control signalings and the capability message.

In some examples, the capability message indicates that the UE is capable of receiving a single downlink message during the time slot, and the downlink monitoring component 835 may be configured as or otherwise support a means for receiving the first downlink message during the time slot based on the one or more control signalings and the capability message.

In some examples, the downlink monitoring comparison component 840 may be configured as or otherwise support a means for receiving, via the first resource allocation, the first downlink message during the time slot based on the one or more control signalings and the capability message, where the first downlink message includes a larger transport block size, a larger number of coded bits, or both, than the second downlink message.

In some examples, the downlink monitoring repetition component 845 may be configured as or otherwise support a means for receiving, via the first resource allocation, the first downlink message during the time slot based on the one or more control signalings and the capability message, where the first downlink message includes a smaller number of configured repetitions than the second downlink message.

In some examples, the downlink monitoring priority component 850 may be configured as or otherwise support a means for receiving, via the first resource allocation, the first downlink message during the time slot based on the one or more control signalings and the capability message, where the first downlink message is associated with a higher priority than the second downlink message.

In some examples, the downlink monitoring MCS component 855 may be configured as or otherwise support a means for receiving, via the first resource allocation, the first downlink message during the time slot based on the one or more control signalings and the capability message, where the first downlink message is associated with a lower MCS than the second downlink message.

In some examples, the configuration monitoring component 860 may be configured as or otherwise support a means for receiving, via the first resource allocation, the first downlink message during the time slot based on the one or more control signalings and the capability message, where the first SPS configuration is associated with an index value smaller than an index value associated with the second SPS configuration.

In some examples, the configuration monitoring component 860 may be configured as or otherwise support a means for receiving, via the second resource allocation, the first downlink message during the time slot based on the one or more control signalings and the capability message, where the second resource allocation is larger than the first resource allocation.

In some examples, receiving the first downlink message is based on a transport block size corresponding to the second resource allocation.

In some examples, the first downlink message is associated with a higher MCS than the second downlink message.

In some examples, the first downlink message is associated with a lower MCS than the second downlink message.

In some examples, the downlink monitoring component 835 may be configured as or otherwise support a means for receiving the first downlink message during the time slot based on the one or more control signalings and the capability message, where the first downlink message is received via a third resource allocation that includes at least a portion of the first resource allocation and the second resource allocation.

In some examples, the one or more control signalings indicate that the first downlink message and the second downlink message are not overlapping in time and the first downlink message and the second downlink message each correspond to a same TCI state, and the downlink monitoring component 835 may be configured as or otherwise support a means for receiving, using a same receive beam corresponding to the same TCI state, the first downlink message and the second downlink message via the first resource allocation or the second resource allocation, or both based on the one or more control signalings and the capability message.

In some examples, the one or more control signalings indicate the first downlink message and the second downlink message are not overlapping in time and the first downlink message and the second downlink message each correspond to different TCI states, and the downlink monitoring component 835 may be configured as or otherwise support a means for receiving, using a first receive beam corresponding to a first TCI state of the different TCI states, at least a portion of the first downlink message via the first resource allocation based on the one or more control signalings and the capability message. In some examples, the one or more control signalings indicate the first downlink message and the second downlink message are not overlapping in time and the first downlink message and the second downlink message each correspond to different TCI states, and the downlink monitoring component 835 may be configured as or otherwise support a means for receiving, using a second receive beam corresponding to a second TCI state of the different TCI states, at least a portion of the second downlink message via the second resource allocation based on the one or more control signalings and the capability message.

Figure 9:
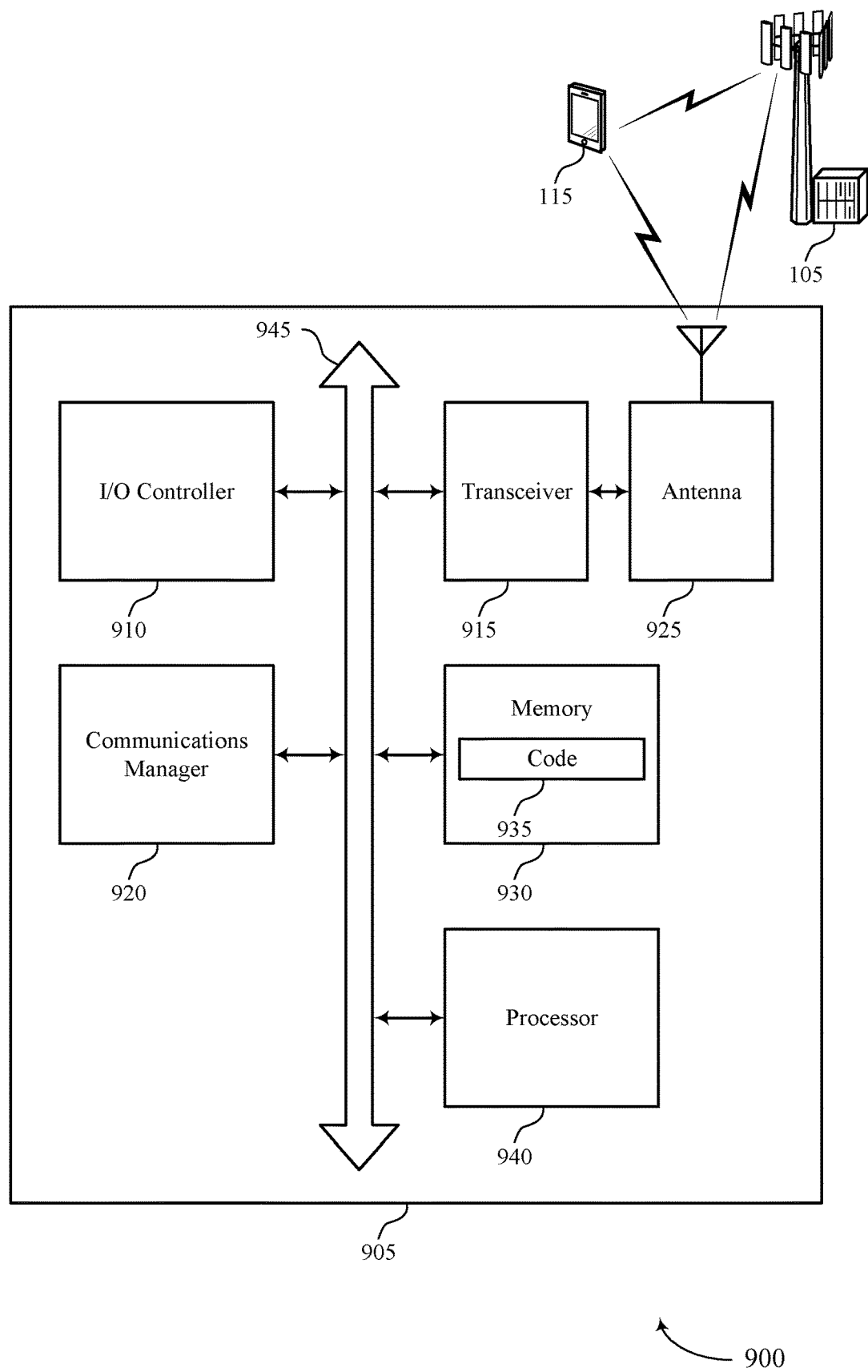
FIG. 9 shows a diagram of a system including a device that supports operations for overlapping downlink communications with different resource allocations in accordance with aspects of the present disclosure.

FIG. 9 shows a diagram of a system 900 including a device 905 that supports operations for overlapping downlink communications with different resource allocations in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting operations for overlapping downlink communications with different resource allocations). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, to a base station, a capability message indicating a capability of the UE to receive one or more downlink messages during a time slot. The communications manager 920 may be configured as or otherwise support a means for receiving, from the base station, one or more control signalings which schedule a first downlink message and a second downlink message during the time slot, indicate a first resource allocation scheduled by a first SPS configuration, and indicate a second resource allocation scheduled by a second SPS configuration. The communications manager 920 may be configured as or otherwise support a means for monitoring for one or both of the first downlink message and the second downlink message during the time slot based on the one or more control signalings and the capability message.

By including or configuring the communications manager 920 in accordance with examples as described herein, the device 905 may support techniques for improved communication reliability, more efficient utilization of communication resources, and improved coordination between devices, among other examples.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of operations for overlapping downlink communications with different resource allocations as described herein, or the processor 940 and the memory 930 may be otherwise configured to perform or support such operations.

Figure 10:
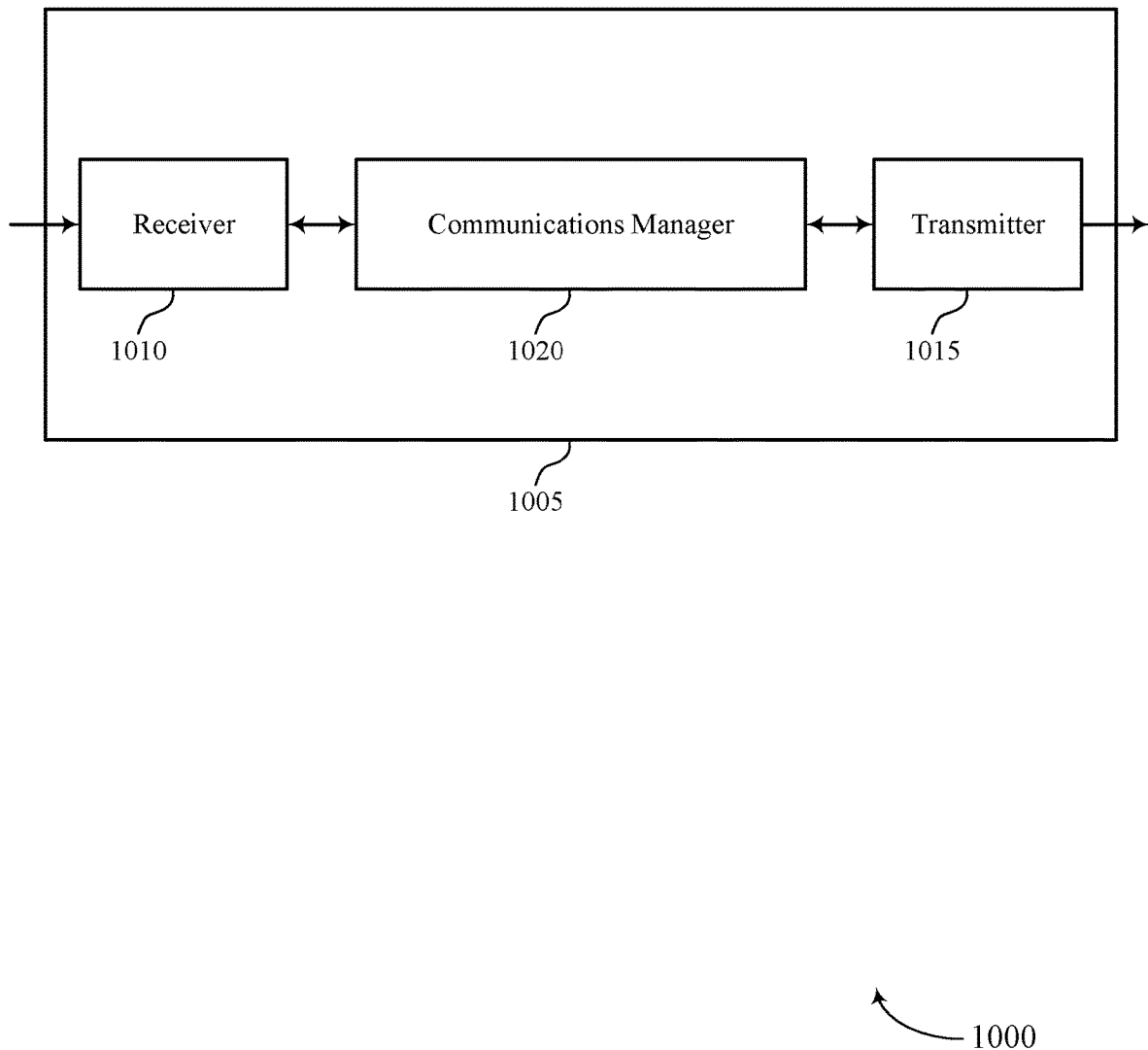
FIGS. 10 and 11 show diagrams of devices that support operations for overlapping downlink communications with different resource allocations in accordance with aspects of the present disclosure.

FIG. 10 shows a diagram 1000 of a device 1005 that supports operations for overlapping downlink communications with different resource allocations in accordance with aspects of the present disclosure. The device 1005 may be an example of aspects of a base station 105 as described herein. The device 1005 may include a receiver 1010, a transmitter 1015, and a communications manager 1020. The device

1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to operations for overlapping downlink communications with different resource allocations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to operations for overlapping downlink communications with different resource allocations). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of operations for overlapping downlink communications with different resource allocations as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

For example, the communications manager 1020 may be configured as or otherwise support a means for receiving, from a UE, a capability message indicating a capability of the UE to receive one or more downlink messages during a time slot. The communications manager 1020 may be configured as or otherwise support a means for transmitting, to the UE, one or more control signalings which schedule a first downlink message and a second downlink message during the time slot, indicate a first resource allocation scheduled by a first SPS configuration, and indicate a second resource allocation scheduled by a second SPS configuration. The communications manager 1020 may be configured as or otherwise support a means for transmitting one or both of the first downlink message and the second downlink message during the time slot based on the one or more control signalings and the capability message.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources including higher data rates, increased capacity, and increased spectral efficiency, among other examples.

Figure 11:
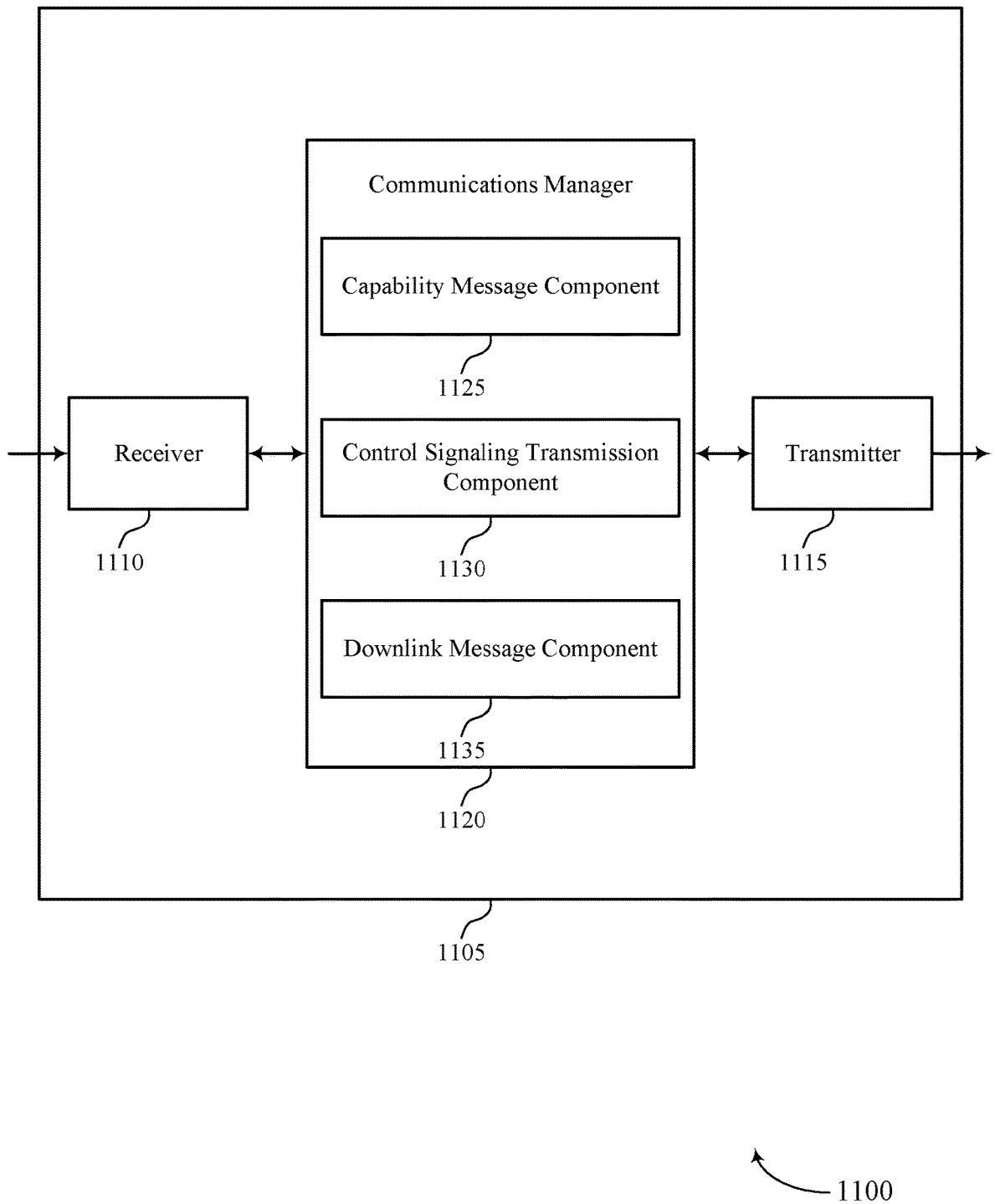

FIG. 11 shows a diagram 1100 of a device 1105 that supports operations for overlapping downlink communications with different resource allocations in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to operations for overlapping downlink communications with different resource allocations). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to operations for overlapping downlink communications with different resource allocations). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of operations for overlapping downlink communications with different resource allocations as described herein. For example, the communications manager 1120 may include a capability message component 1125, a control signaling transmission component 1130, a downlink message component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The capability message component 1125 may be configured as or otherwise support a means for receiving, from a UE, a capability message indicating a capability of the UE to receive one or more downlink messages during a time slot. The control signaling transmission component 1130 may be configured as or otherwise support a means for transmitting, to the UE, one or more control signalings which schedule a first downlink message and a second downlink message during the time slot, indicate a first resource allocation scheduled by a first SPS configuration, and indicate a second resource allocation scheduled by a second SPS configuration. The downlink message component 1135 may be configured as or otherwise support a means for transmitting one or both of the first downlink message and the second downlink message during the time slot based on the one or more control signalings and the capability message.

Figure 12:
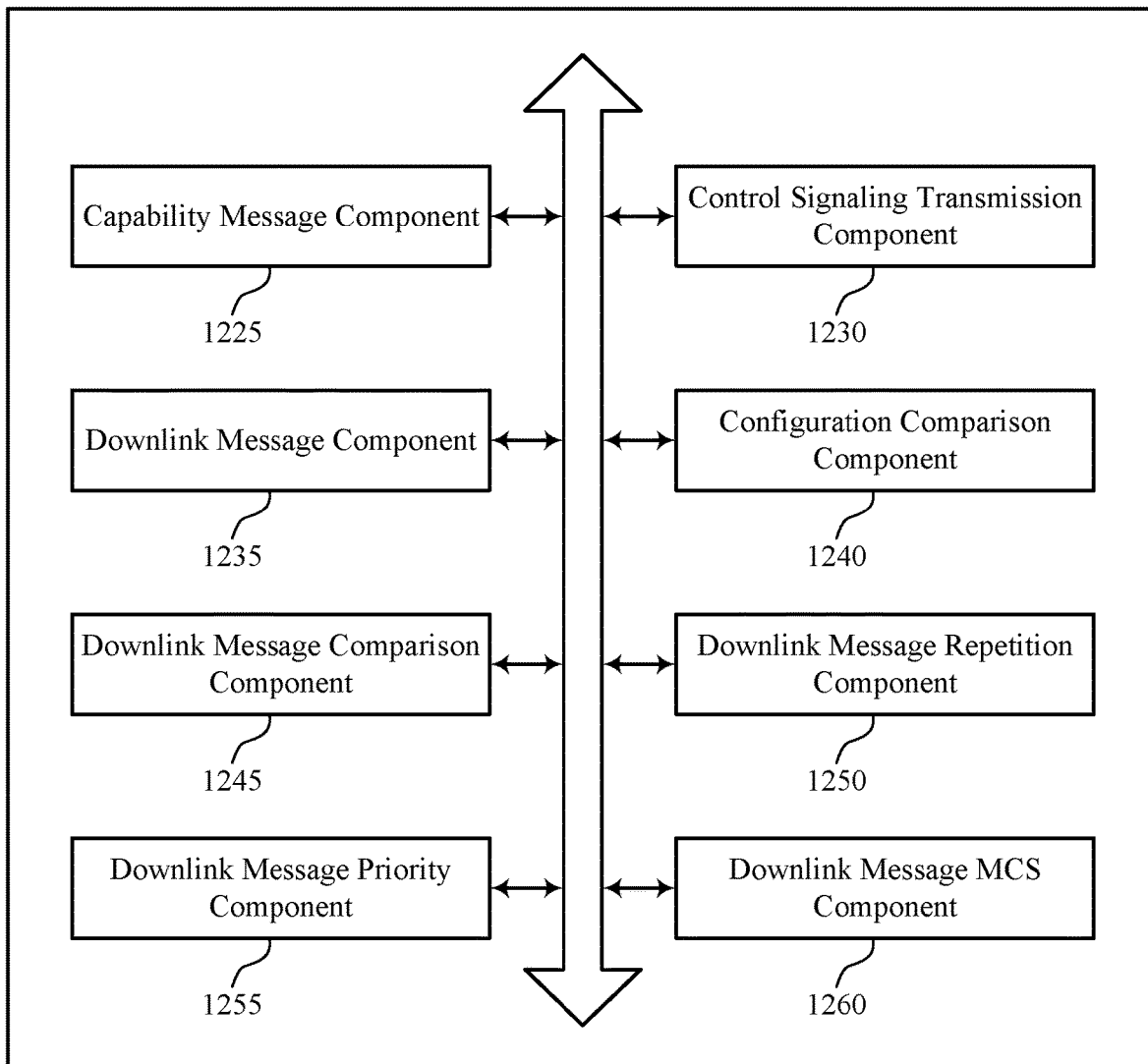
FIG. 12 shows a diagram of a communications manager that supports operations for overlapping downlink communications with different resource allocations in accordance with aspects of the present disclosure.

FIG. 12 shows a diagram 1200 of a communications manager 1220 that supports operations for overlapping downlink communications with different resource allocations in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of operations for overlapping downlink communications with different resource allocations as described herein. For example, the communications manager 1220 may include a capability message component 1225, a control signaling transmission component 1230, a downlink message component 1235, a configuration comparison component 1240, a downlink message comparison component 1245, a downlink message repetition component 1250, a downlink message priority component 1255, a downlink message MCS component 1260, or any combination thereof. Each of these components may communicate, directly or indirectly, with one another (e.g., via one or more buses).

The capability message component 1225 may be configured as or otherwise support a means for receiving, from a UE, a capability message indicating a capability of the UE to receive one or more downlink messages during a time slot. The control signaling transmission component 1230 may be configured as or otherwise support a means for transmitting, to the UE, one or more control signalings which schedule a first downlink message and a second downlink message during the time slot, indicate a first resource allocation scheduled by a first SPS configuration, and indicate a second resource allocation scheduled by a second SPS configuration. The downlink message component 1235 may be configured as or otherwise support a means for transmitting one or both of the first downlink message and the second downlink message during the time slot based on the one or more control signalings and the capability message.

In some examples, the capability message indicates that the UE is capable of receiving a single downlink message during the time slot, and the downlink message component 1235 may be configured as or otherwise support a means for transmitting the first downlink message during the time slot based on the one or more control signalings and the capability message.

In some examples, the downlink message comparison component 1245 may be configured as or otherwise support a means for transmitting, via the first resource allocation, the first downlink message during the time slot based on the one or more control signalings and the capability message, where the first downlink message includes a larger transport block size, a larger number of coded bits, or both, than the second downlink message.

In some examples, the downlink message repetition component 1250 may be configured as or otherwise support a means for transmitting, via the first resource allocation, the first downlink message during the time slot based on the one or more control signalings and the capability message, where the first downlink message includes a smaller number of configured repetitions than the second downlink message.

In some examples, the downlink message priority component 1255 may be configured as or otherwise support a means for transmitting, via the first resource allocation, the first downlink message during the time slot based on the one or more control signalings and the capability message, where the first downlink message is associated with a higher priority than the second downlink message.

In some examples, the downlink message MCS component 1260 may be configured as or otherwise support a means for transmitting, via the first resource allocation, the first downlink message during the time slot based on the one or more control signalings and the capability message, where the first downlink message is associated with a lower MCS than the second downlink message.

In some examples, the configuration comparison component 1240 may be configured as or otherwise support a means for transmitting, via the first resource allocation, the first downlink message during the time slot based on the one or more control signalings and the capability message, where the first SPS configuration is associated with an index value smaller than an index value associated with the second SPS configuration.

In some examples, the configuration comparison component 1240 may be configured as or otherwise support a means for transmitting, via the second resource allocation, the first downlink message during the time slot based on the one or more control signalings and the capability message, where the second resource allocation is larger than the first resource allocation.

In some examples, transmitting the first downlink message is based on a transport block size corresponding to the second resource allocation.

In some examples, the first downlink message is associated with a higher MCS than the second downlink message.

In some examples, the first downlink message is associated with a lower MCS than the second downlink message.

In some examples, the downlink message component 1235 may be configured as or otherwise support a means for transmitting the first downlink message during the time slot based on the one or more control signalings and the capability message, where the first downlink message is transmitted via a third resource allocation that includes at least a portion of the first resource allocation and the second resource allocation.

In some examples, the one or more control signalings indicate that the first downlink message and the second downlink message are not overlapping in time and the first downlink message and the second downlink message each correspond to a same TCI state, and the downlink message component 1235 may be configured as or otherwise support a means for transmitting, using a same transmit beam corresponding to the same TCI state, the first downlink message and the second downlink message via the first resource allocation or the second resource allocation, or both based on the one or more control signalings and the capability message.

In some examples, the one or more control signalings indicate the first downlink message and the second downlink message are not overlapping in time and the first downlink message and the second downlink message each correspond to different TCI states, and the downlink message component 1235 may be configured as or otherwise support a means for transmitting, using a first transmit beam corresponding to a first TCI state of the different TCI states, at least a portion of the first downlink message via the first resource allocation based on the one or more control signalings and the capability message. In some examples, the one or more control signalings indicate the first downlink message and the second downlink message are not overlapping in time and the first downlink message and the second downlink message each correspond to different TCI states, and the downlink message component 1235 may be configured as or otherwise support a means for transmitting, using a second transmit beam corresponding to a second TCI state of the different TCI states, at least a portion of the second downlink message via the second resource allocation based on the one or more control signalings and the capability message.

Figure 13:
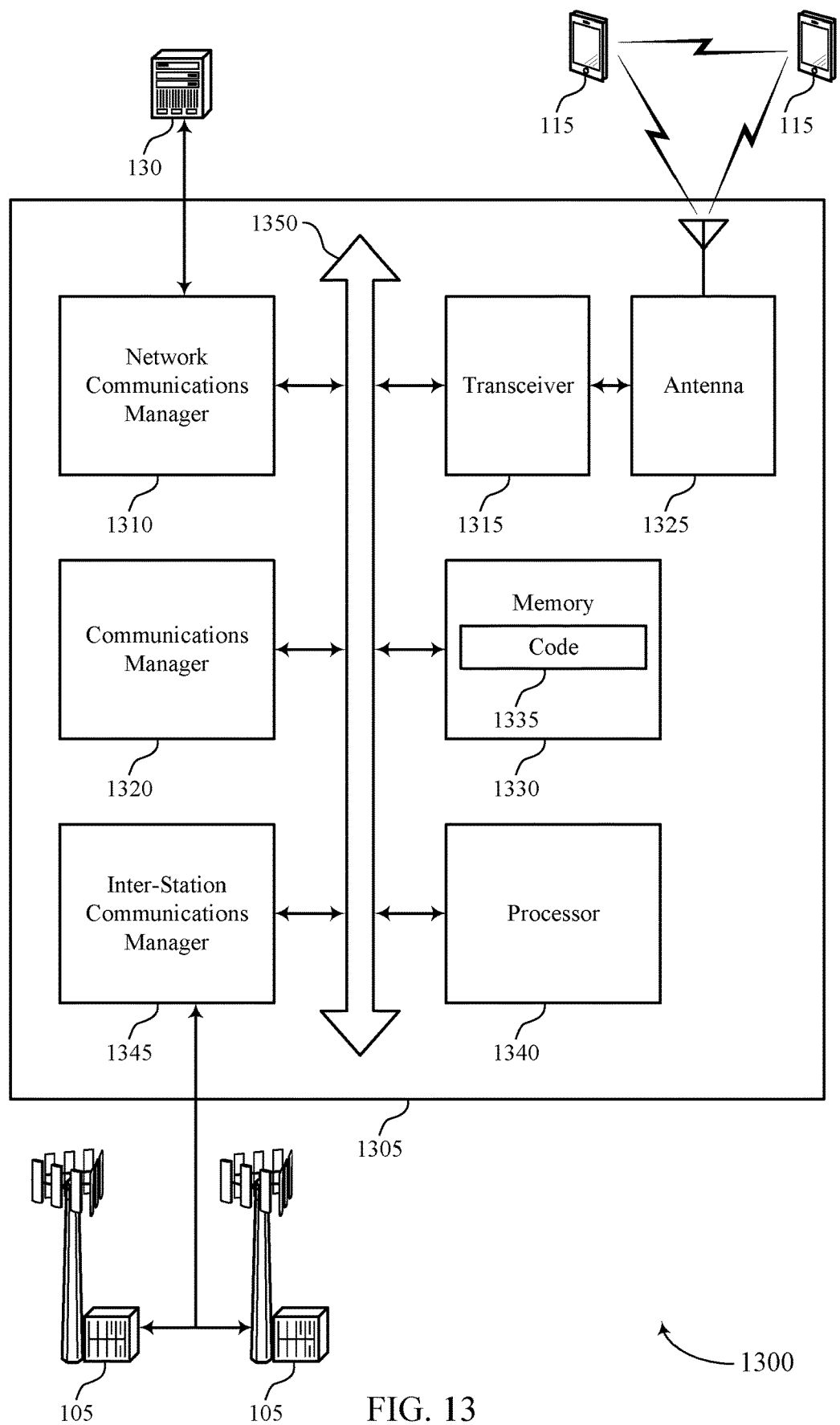
FIG. 13 shows a diagram of a system including a device that supports operations for overlapping downlink communications with different resource allocations in accordance with aspects of the present disclosure.

FIG. 13 shows a diagram of a system 1300 including a device 1305 that supports operations for overlapping downlink communications with different resource allocations in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting operations for overlapping downlink communications with different resource allocations). For example, the device 1305 or a component of the device 1305 may include a processor 1340 and memory 1330 coupled with or to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

For example, the communications manager 1320 may be configured as or otherwise support a means for receiving, from a UE, a capability message indicating a capability of the UE to receive one or more downlink messages during a time slot. The communications manager 1320 may be configured as or otherwise support a means for transmitting, to the UE, one or more control signalings which schedule a first downlink message and a second downlink message during the time slot, indicate a first resource allocation scheduled by a first SPS configuration, and indicate a second resource allocation scheduled by a second SPS configuration. The communications manager 1320 may be configured as or otherwise support a means for transmitting one or both of the first downlink message and the second downlink message during the time slot based on the one or more control signalings and the capability message.

By including or configuring the communications manager 1320 in accordance with examples as described herein, the device 1305 may support techniques for improved communication reliability, more efficient utilization of communication resources, and improved coordination between devices, among other examples.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of operations for overlapping downlink communications with different resource allocations as described herein, or the processor 1340 and the memory 1330 may be otherwise configured to perform or support such operations.

Figure 14:
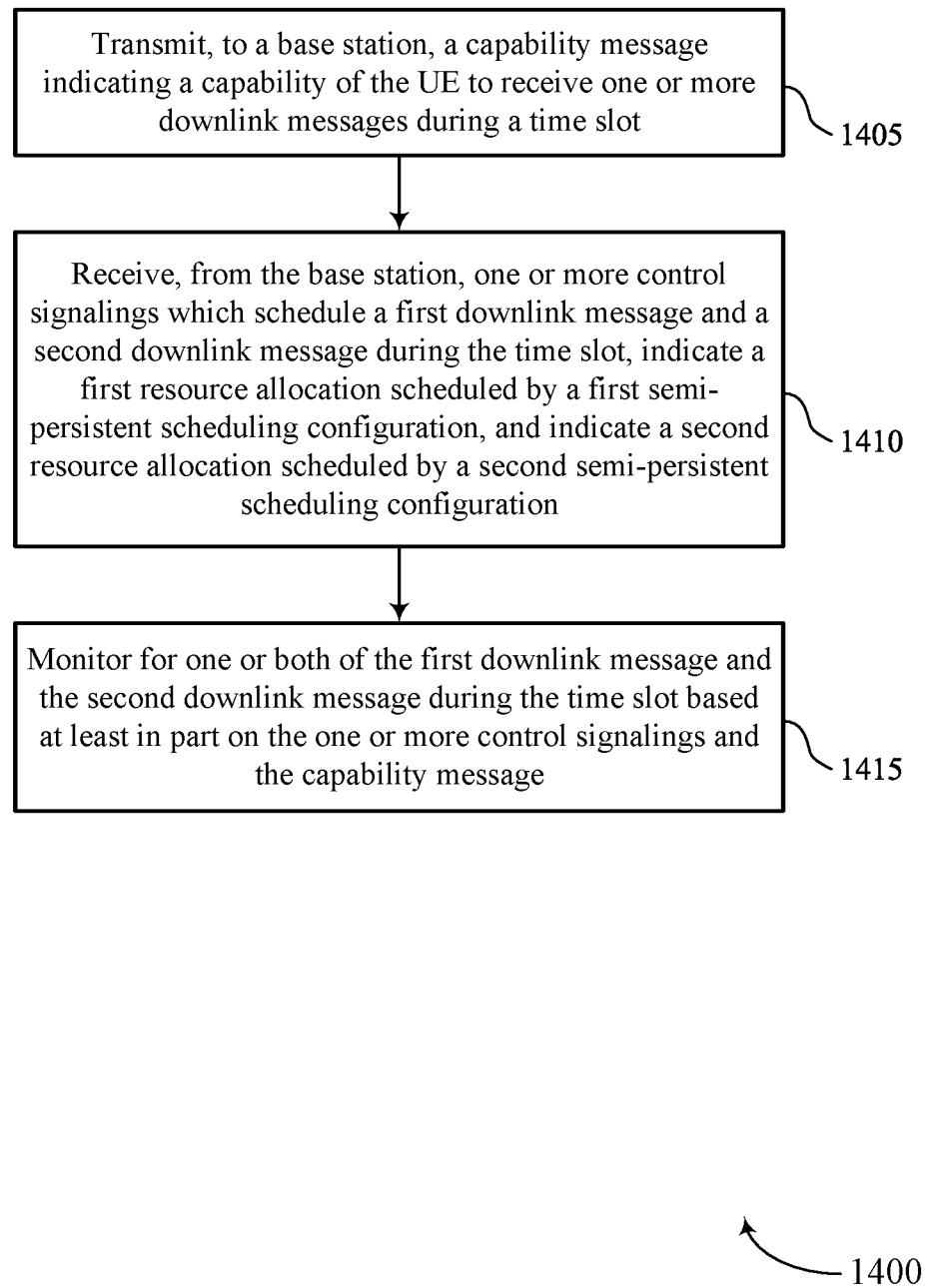
FIGS. 14 through 19 show flowcharts illustrating methods that support operations for overlapping downlink communications with different resource allocations in accordance with aspects of the present disclosure.

FIG. 14 shows a flowchart illustrating a method 1400 that supports operations for overlapping downlink communications with different resource allocations in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting, to a base station, a capability message indicating a capability of the UE to receive one or more downlink messages during a time slot. The operations of 1405 may be performed in accordance with examples as disclosed herein. In some examples, aspects of the operations of 1405 may be performed by a capability indication component 825 as described with reference to FIG. 8.

At 1410, the method may include receiving, from the base station, one or more control signalings which schedule a first downlink message and a second downlink message during the time slot, indicate a first resource allocation scheduled by a first SPS configuration, and indicate a second resource allocation scheduled by a second SPS configuration. The operations of 1410 may be performed in accordance with examples as disclosed herein. In some examples, aspects of the operations of 1410 may be performed by a control signaling component 830 as described with reference to FIG. 8.

At 1415, the method may include monitoring for one or both of the first downlink message and the second downlink message during the time slot based on the one or more control signalings and the capability message. The operations of 1415 may be performed in accordance with examples as disclosed herein. In some examples, aspects of the operations of 1415 may be performed by a downlink monitoring component 835 as described with reference to FIG. 8.

Figure 15:
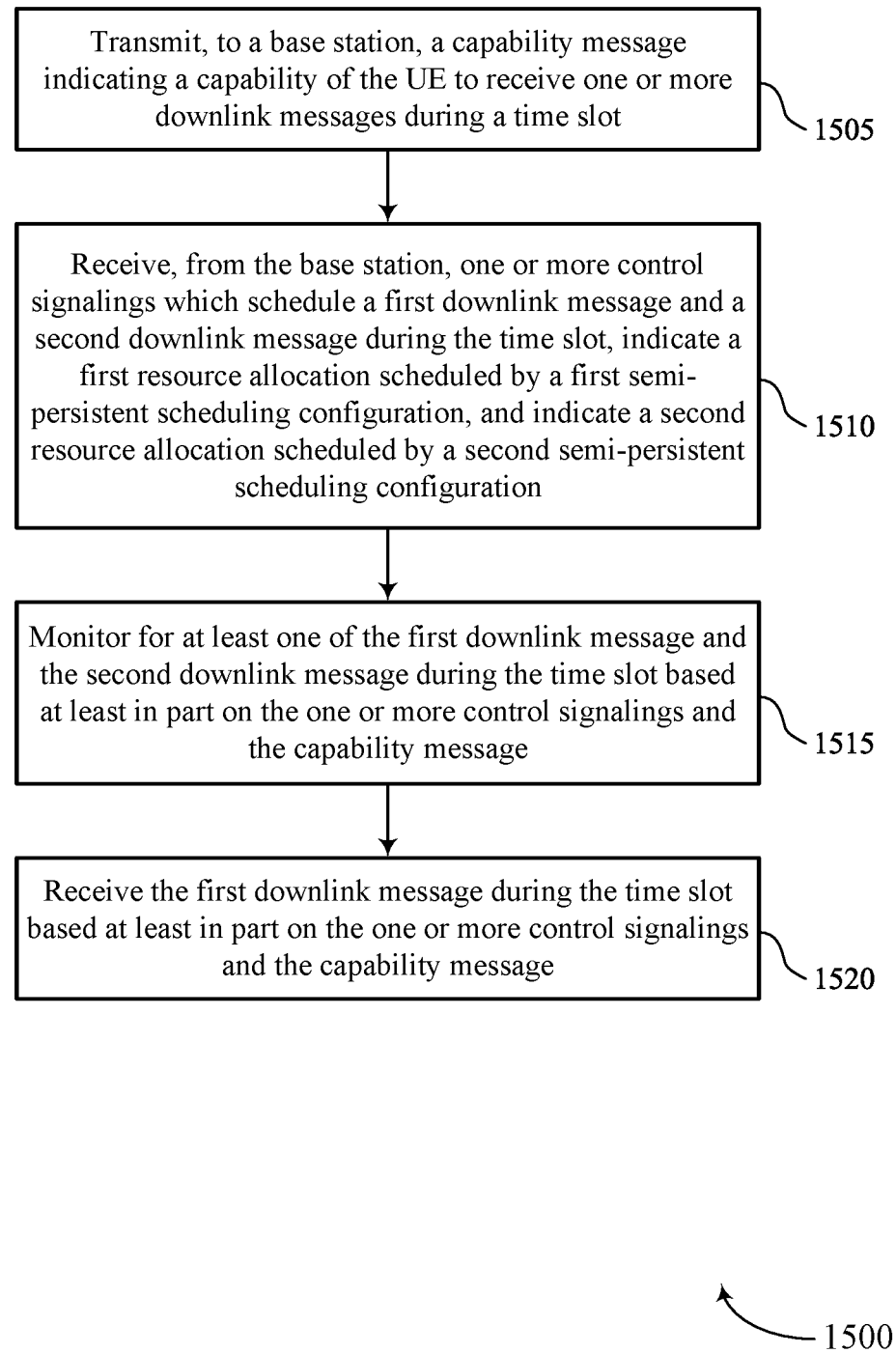

FIG. 15 shows a flowchart illustrating a method 1500 that supports operations for overlapping downlink communications with different resource allocations in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting, to a base station, a capability message indicating a capability of the UE to receive one or more downlink messages during a time slot. The operations of 1505 may be performed in accordance with examples as disclosed herein. In some examples, aspects of the operations of 1505 may be performed by a capability indication component 825 as described with reference to FIG. 8.

At 1510, the method may include receiving, from the base station, one or more control signalings which schedule a first downlink message and a second downlink message during the time slot, indicate a first resource allocation scheduled by a first SPS configuration, and indicate a second resource allocation scheduled by a second SPS configuration. The operations of 1510 may be performed in accordance with examples as disclosed herein. In some examples, aspects of the operations of 1510 may be performed by a control signaling component 830 as described with reference to FIG. 8.

At 1515, the method may include monitoring for one or both of the first downlink message and the second downlink message during the time slot based on the one or more control signalings and the capability message. The operations of 1515 may be performed in accordance with examples as disclosed herein. In some examples, aspects of the operations of 1515 may be performed by a downlink monitoring component 835 as described with reference to FIG. 8.

At 1520, the method may include receiving the first downlink message during the time slot based on the one or more control signalings and the capability message. The operations of 1520 may be performed in accordance with examples as disclosed herein. In some examples, aspects of the operations of 1520 may be performed by a downlink monitoring component 835 as described with reference to FIG. 8.

Figure 16:
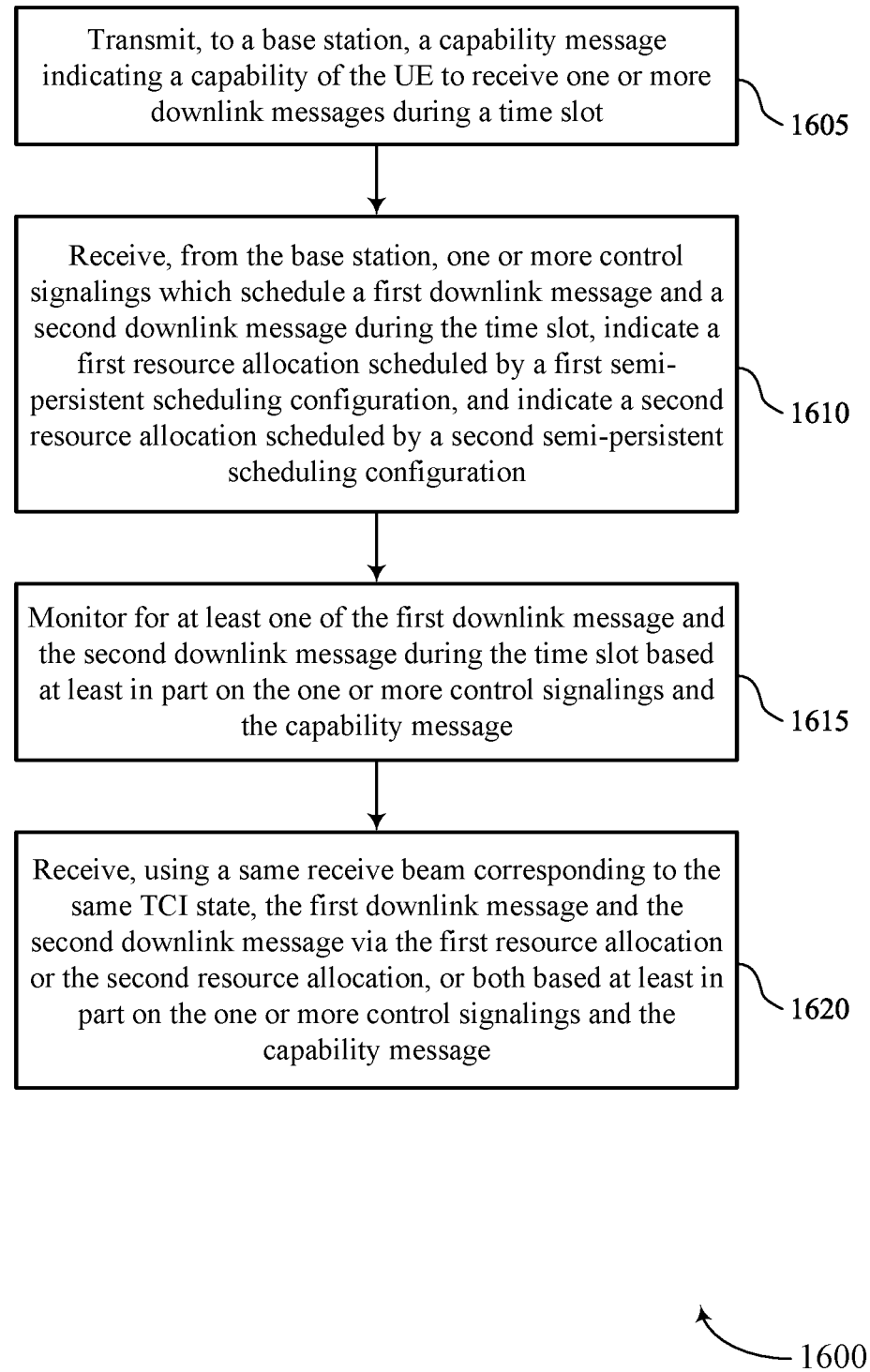

FIG. 16 shows a flowchart illustrating a method 1600 that supports operations for overlapping downlink communications with different resource allocations in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include transmitting, to a base station, a capability message indicating a capability of the UE to receive one or more downlink messages during a time slot. The operations of 1605 may be performed in accordance with examples as disclosed herein. In some examples, aspects of the operations of 1605 may be performed by a capability indication component 825 as described with reference to FIG. 8.

At 1610, the method may include receiving, from the base station, one or more control signalings which schedule a first downlink message and a second downlink message during the time slot, indicate a first resource allocation scheduled by a first SPS configuration, and indicate a second resource allocation scheduled by a second SPS configuration. The operations of 1610 may be performed in accordance with examples as disclosed herein. In some examples, aspects of the operations of 1610 may be performed by a control signaling component 830 as described with reference to FIG. 8.

At 1615, the method may include monitoring for one or both of the first downlink message and the second downlink message during the time slot based on the one or more control signalings and the capability message. The operations of 1615 may be performed in accordance with examples as disclosed herein. In some examples, aspects of the operations of 1615 may be performed by a downlink monitoring component 835 as described with reference to FIG. 8.

At 1620, the method may include receiving, using a same receive beam corresponding to the same TCI state, the first downlink message and the second downlink message via the first resource allocation or the second resource allocation, or both based on the one or more control signalings and the capability message. The operations of 1620 may be performed in accordance with examples as disclosed herein. In some examples, aspects of the operations of 1620 may be performed by a downlink monitoring component 835 as described with reference to FIG. 8.

Figure 17:
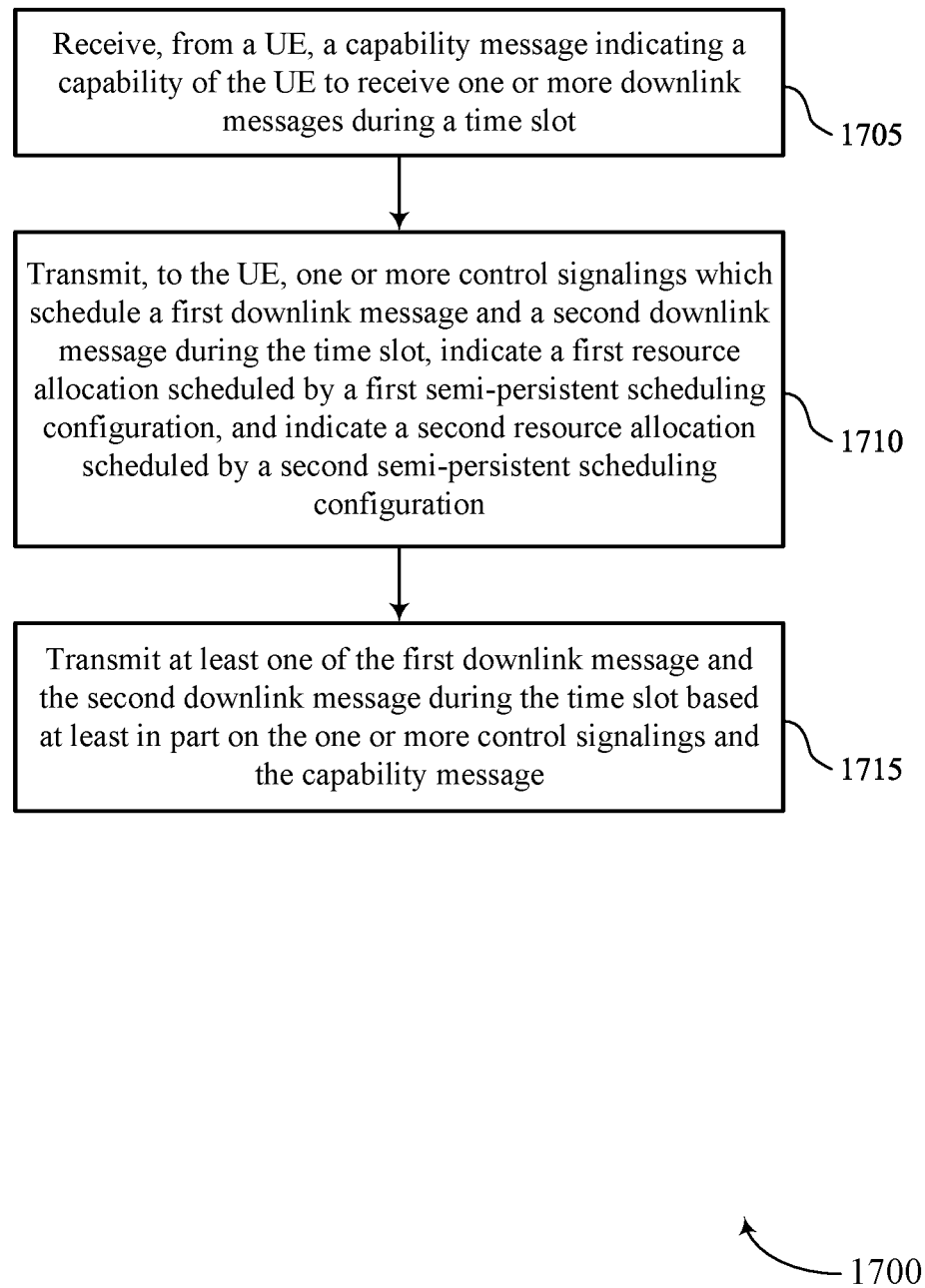

FIG. 17 shows a flowchart illustrating a method 1700 that supports operations for overlapping downlink communications with different resource allocations in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a capability message indicating a capability of the UE to receive one or more downlink messages during a time slot. The operations of 1705 may be performed in accordance with examples as disclosed herein. In some examples, aspects of the operations of 1705 may be performed by a capability message component 1225 as described with reference to FIG. 12.

At 1710, the method may include transmitting, to the UE, one or more control signalings which schedule a first downlink message and a second downlink message during the time slot, indicate a first resource allocation scheduled by a first SPS configuration, and indicate a second resource allocation scheduled by a second SPS configuration. The operations of 1710 may be performed in accordance with examples as disclosed herein. In some examples, aspects of the operations of 1710 may be performed by a control signaling transmission component 1230 as described with reference to FIG. 12.

At 1715, the method may include transmitting one or both of the first downlink message and the second downlink message during the time slot based on the one or more control signalings and the capability message. The operations of 1715 may be performed in accordance with examples as disclosed herein. In some examples, aspects of the operations of 1715 may be performed by a downlink message component 1235 as described with reference to FIG. 12.

Figure 18:
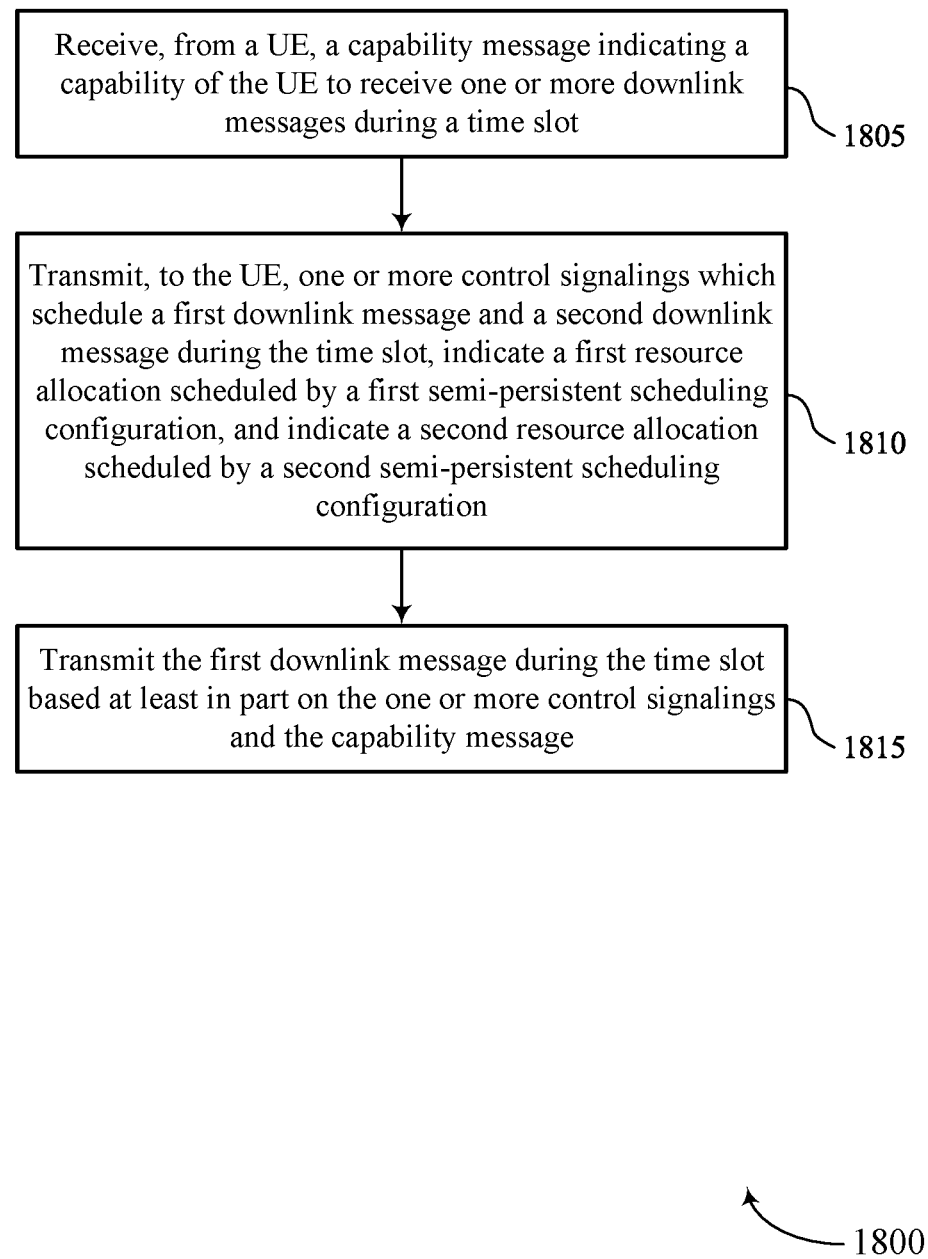

FIG. 18 shows a flowchart illustrating a method 1800 that supports operations for overlapping downlink communications with different resource allocations in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a capability message indicating a capability of the UE to receive one or more downlink messages during a time slot. The operations of 1805 may be performed in accordance with examples as disclosed herein. In some examples, aspects of the operations of 1805 may be performed by a capability message component 1225 as described with reference to FIG. 12.

At 1810, the method may include transmitting, to the UE, one or more control signalings which schedule a first downlink message and a second downlink message during the time slot, indicate a first resource allocation scheduled by a first SPS configuration, and indicate a second resource allocation scheduled by a second SPS configuration. The operations of 1810 may be performed in accordance with examples as disclosed herein. In some examples, aspects of the operations of 1810 may be performed by a control signaling transmission component 1230 as described with reference to FIG. 12.

At 1815, the method may include transmitting the first downlink message during the time slot based on the one or more control signalings and the capability message. The operations of 1815 may be performed in accordance with examples as disclosed herein. In some examples, aspects of the operations of 1815 may be performed by a downlink message component 1235 as described with reference to FIG. 12.

Figure 19:
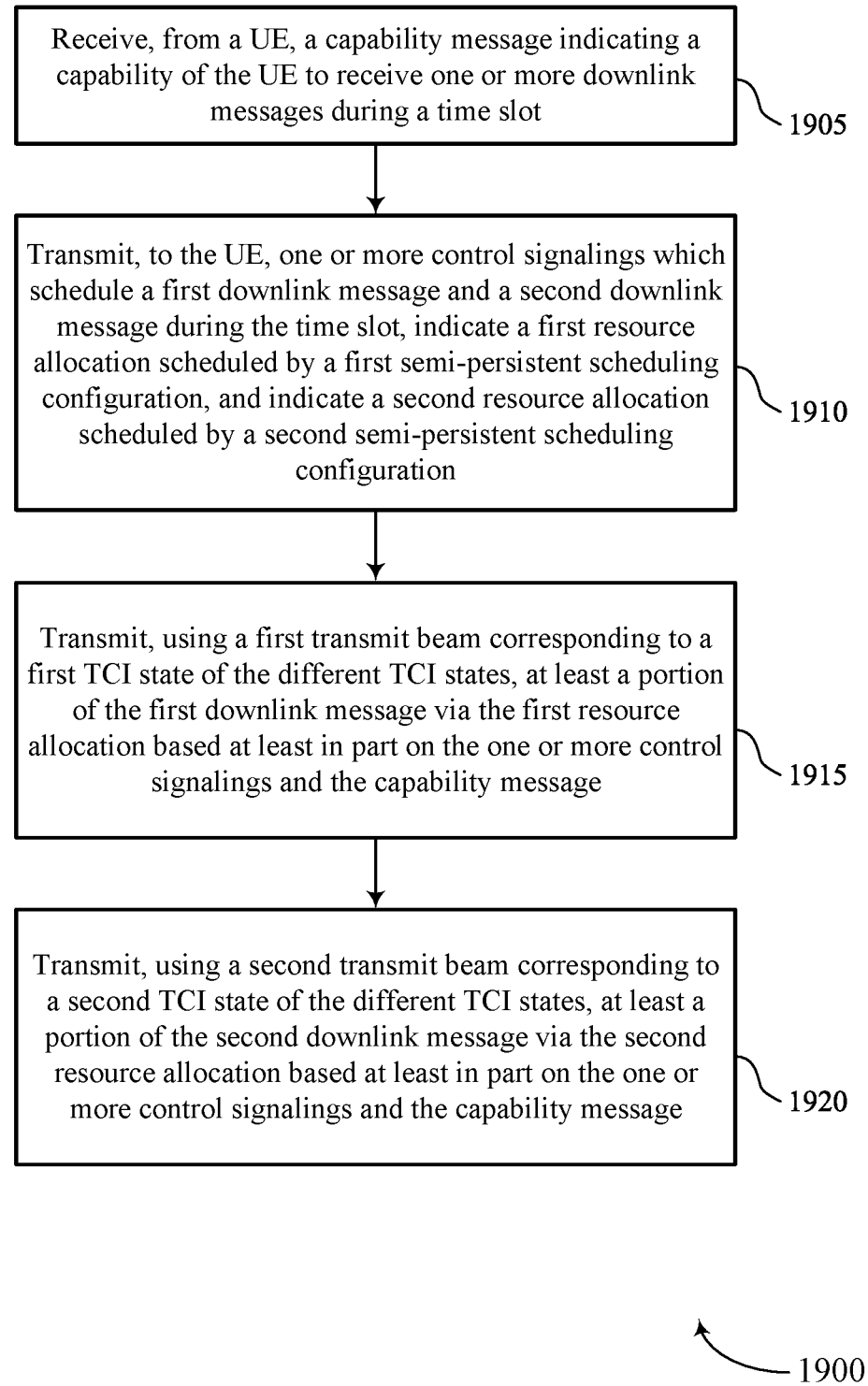

FIG. 19 shows a flowchart illustrating a method 1900 that supports operations for overlapping downlink communications with different resource allocations in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include receiving, from a UE, a capability message indicating a capability of the UE to receive one or more downlink messages during a time slot. The operations of 1905 may be performed in accordance with examples as disclosed herein. In some examples, aspects of the operations of 1905 may be performed by a capability message component 1225 as described with reference to FIG. 12.

At 1910, the method may include transmitting, to the UE, one or more control signalings which schedule a first downlink message and a second downlink message during the time slot, indicate a first resource allocation scheduled by a first SPS configuration, and indicate a second resource allocation scheduled by a second SPS configuration. The operations of 1910 may be performed in accordance with examples as disclosed herein. In some examples, aspects of the operations of 1910 may be performed by a control signaling transmission component 1230 as described with reference to FIG. 12.

At 1915, the method may include transmitting, using a first transmit beam corresponding to a first TCI state of the different TCI states, at least a portion of the first downlink message via the first resource allocation based on the one or more control signalings and the capability message. The operations of 1915 may be performed in accordance with examples as disclosed herein. In some examples, aspects of the operations of 1915 may be performed by a downlink message component 1235 as described with reference to FIG. 12.

At 1920, the method may include transmitting, using a second transmit beam corresponding to a second TCI state of the different TCI states, at least a portion of the second downlink message via the second resource allocation based on the one or more control signalings and the capability message. The operations of 1920 may be performed in accordance with examples as disclosed herein. In some examples, aspects of the operations of 1920 may be performed by a downlink message component 1235 as described with reference to FIG. 12.

The following provides an overview of aspects of the present disclosure:

Aspect 1: A method for wireless communication at a UE, comprising: transmitting, to a base station, a capability message indicating a capability of the UE to receive one or more downlink messages during a time slot; receiving, from the base station, one or more control signalings which schedule a first downlink message and a second downlink message during the time slot, indicate a first resource allocation scheduled by a first SPS configuration, and indicate a second resource allocation scheduled by a second SPS configuration; and monitoring for one or both of the first downlink message and the second downlink message during the time slot based at least in part on the one or more control signalings and the capability message.

Aspect 2: The method of aspect 1, wherein the capability message indicates that the UE is capable of receiving a single downlink message during the time slot, the method further comprising: receiving the first downlink message during the time slot based at least in part on the one or more control signalings and the capability message.

Aspect 3: The method of aspect 2, further comprising: receiving, via the first resource allocation, the first downlink message during the time slot based at least in part on the one or more control signalings and the capability message, wherein the first downlink message comprises a larger transport block size, a larger number of coded bits, or both, than the second downlink message.

Aspect 4: The method of any of aspects 2 through 3, further comprising: receiving, via the first resource allocation, the first downlink message during the time slot based at least in part on the one or more control signalings and the capability message, wherein the first downlink message comprises a smaller number of configured repetitions than the second downlink message.

Aspect 5: The method of any of aspects 2 through 4, further comprising: receiving, via the first resource allocation, the first downlink message during the time slot based at least in part on the one or more control signalings and the capability message, wherein the first downlink message is associated with a higher priority than the second downlink message.

Aspect 6: The method of any of aspects 2 through 5, further comprising: receiving, via the first resource allocation, the first downlink message during the time slot based at least in part on the one or more control signalings and the capability message, wherein the first downlink message is associated with a lower MCS than the second downlink message.

Aspect 7: The method of any of aspects 2 through 6, further comprising: receiving, via the first resource allocation, the first downlink message during the time slot based at least in part on the one or more control signalings and the capability message, wherein the first SPS configuration is associated with an index value smaller than an index value associated with the second SPS configuration.

Aspect 8: The method of any of aspects 2 through 7, further comprising: receiving, via the second resource allocation, the first downlink message during the time slot based at least in part on the one or more control signalings and the capability message, wherein the second resource allocation is larger than the first resource allocation.

Aspect 9: The method of aspect 8, wherein receiving the first downlink message is based at least in part on a transport block size corresponding to the second resource allocation.

Aspect 10: The method of any of aspects 8 through 9, wherein the first downlink message is associated with a higher MCS than the second downlink message.

Aspect 11: The method of any of aspects 8 through 10, wherein the first downlink message is associated with a lower MCS than the second downlink message.

Aspect 12: The method of any of aspects 2 through 11, further comprising: receiving the first downlink message during the time slot based at least in part on the one or more control signalings and the capability message, wherein the first downlink message is received via a third resource allocation that comprises at least a portion of the first resource allocation and the second resource allocation.

Aspect 13: The method of any of aspects 1 through 12, wherein the one or more control signalings indicate that the first downlink message and the second downlink message are not overlapping in time and the first downlink message and the second downlink message each correspond to a same TCI state, the method further comprising: receiving, using a same receive beam corresponding to the same TCI state, the first downlink message and the second downlink message via the first resource allocation or the second resource allocation, or both based at least in part on the one or more control signalings and the capability message.

Aspect 14: The method of any of aspects 1 through 13, wherein the one or more control signalings indicate the first downlink message and the second downlink message are not overlapping in time and the first downlink message and the second downlink message each correspond to different TCI states, the method further comprising: receiving, using a first receive beam corresponding to a first TCI state of the different TCI states, at least a portion of the first downlink message via the first resource allocation based at least in part on the one or more control signalings and the capability message; and receiving, using a second receive beam corresponding to a second TCI state of the different TCI states, at least a portion of the second downlink message via the second resource allocation based at least in part on the one or more control signalings and the capability message.

Aspect 15: A method of wireless communication at a base station, comprising: receiving, from a UE, a capability message indicating a capability of the UE to receive one or more downlink messages during a time slot; transmitting, to the UE, one or more control signalings which schedule a first downlink message and a second downlink message during the time slot, indicate a first resource allocation scheduled by a first SPS configuration, and indicate a second resource allocation scheduled by a second SPS configuration; and transmitting one or both of the first downlink message and the second downlink message during the time slot based at least in part on the one or more control signalings and the capability message.

Aspect 16: The method of aspect 15, wherein the capability message indicates that the UE is capable of receiving a single downlink message during the time slot, the method further comprising: transmitting the first downlink message during the time slot based at least in part on the one or more control signalings and the capability message.

Aspect 17: The method of aspect 16, further comprising: transmitting, via the first resource allocation, the first downlink message during the time slot based at least in part on the one or more control signalings and the capability message, wherein the first downlink message comprises a larger transport block size, a larger number of coded bits, or both, than the second downlink message.

Aspect 18: The method of any of aspects 16 through 17, further comprising: transmitting, via the first resource allocation, the first downlink message during the time slot based at least in part on the one or more control signalings and the capability message, wherein the first downlink message comprises a smaller number of configured repetitions than the second downlink message.

Aspect 19: The method of any of aspects 16 through 18, further comprising: transmitting, via the first resource allocation, the first downlink message during the time slot based at least in part on the one or more control signalings and the capability message, wherein the first downlink message is associated with a higher priority than the second downlink message.

Aspect 20: The method of any of aspects 16 through 19, further comprising: transmitting, via the first resource allocation, the first downlink message during the time slot based at least in part on the one or more control signalings and the capability message, wherein the first downlink message is associated with a lower MCS than the second downlink message.

Aspect 21: The method of any of aspects 15 through 20, further comprising: transmitting, via the first resource allocation, the first downlink message during the time slot based at least in part on the one or more control signalings and the capability message, wherein the first SPS configuration is associated with an index value smaller than an index value associated with the second SPS configuration.

Aspect 22: The method of any of aspects 15 through 21, further comprising: transmitting, via the second resource allocation, the first downlink message during the time slot based at least in part on the one or more control signalings and the capability message, wherein the second resource allocation is larger than the first resource allocation.

Aspect 23: The method of aspect 22, wherein transmitting the first downlink message is based at least in part on a transport block size corresponding to the second resource allocation.

Aspect 24: The method of any of aspects 22 through 23, wherein the first downlink message is associated with a higher MCS than the second downlink message.

Aspect 25: The method of any of aspects 22 through 24, wherein the first downlink message is associated with a lower MCS than the second downlink message.

Aspect 26: The method of any of aspects 15 through 25, further comprising: transmitting the first downlink message during the time slot based at least in part on the one or more control signalings and the capability message, wherein the first downlink message is transmitted via a third resource allocation that comprises at least a portion of the first resource allocation and the second resource allocation.

Aspect 27: The method of any of aspects 15 through 26, wherein the one or more control signalings indicate that the first downlink message and the second downlink message are not overlapping in time and the first downlink message and the second downlink message each correspond to a same TCI state, the method further comprising: transmitting, using a same transmit beam corresponding to the same TCI state, the first downlink message and the second downlink message via the first resource allocation or the second resource allocation, or both based at least in part on the one or more control signalings and the capability message.

Aspect 28: The method of any of aspects 15 through 27, wherein the one or more control signalings indicate the first downlink message and the second downlink message are not overlapping in time and the first downlink message and the second downlink message each correspond to different TCI states, the method further comprising: transmitting, using a first transmit beam corresponding to a first TCI state of the different TCI states, at least a portion of the first downlink message via the first resource allocation based at least in part on the one or more control signalings and the capability message; and transmitting, using a second transmit beam corresponding to a second TCI state of the different TCI states, at least a portion of the second downlink message via the second resource allocation based at least in part on the one or more control signalings and the capability message.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus comprising a processor; memory coupled with the processor; and instructions stored in the memory and executable by the processor to cause the apparatus to perform a method of any of aspects 15 through 28.

Aspect 33: An apparatus comprising at least one means for performing a method of any of aspects 15 through 28.

Aspect 34: A non-transitory computer-readable medium storing code the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication performed by a user equipment (UE), comprising:
   transmitting, to a base station, a capability message indicating a capability of the UE to receive one or more downlink messages during a time slot, wherein the capability message indicates that the UE is capable of receiving a single downlink message during the time slot;
   receiving, from the base station, one or more control signalings which schedule a first downlink message and a second downlink message during the time slot, indicate a first resource allocation scheduled by a first semi-persistent scheduling configuration, and indicate a second resource allocation scheduled by a second semi-persistent scheduling configuration; and
   receiving, via the first resource allocation, the first downlink message during the time slot based at least in part on the one or more control signalings and the capability message, wherein the first downlink message comprises a smaller number of configured repetitions than the second downlink message.

2. The method of claim 1, wherein the first downlink message comprises a larger transport block size, a larger number of coded bits, or both, than the second downlink message.

3. The method of claim 1, wherein the first downlink message is associated with a higher priority than the second downlink message.

4. The method of claim 1, wherein the first downlink message is associated with a lower modulation and coding scheme than the second downlink message.

5. The method of claim 1, wherein the first semi-persistent scheduling configuration is associated with an index value smaller than an index value associated with the second semi-persistent scheduling configuration.

6. A method of wireless communication performed by a user equipment (UE), comprising:
   transmitting, to a base station, a capability message indicating a capability of the UE to receive one or more downlink messages during a time slot, wherein the capability message indicates that the UE is capable of receiving a single downlink message during the time slot;
   receiving, from the base station, one or more control signalings which schedule a first downlink message and a second downlink message during the time slot, indicate a first resource allocation scheduled by a first semi-persistent scheduling configuration, and indicate a second resource allocation scheduled by a second semi-persistent scheduling configuration; and
   receiving, via the second resource allocation, the first downlink message during the time slot based at least in part on the one or more control signalings and the capability message, wherein the second resource allocation is larger than the first resource allocation.

7. The method of claim 6, wherein receiving the first downlink message is based at least in part on a transport block size corresponding to the second resource allocation.

8. The method of claim 6, wherein the first downlink message is associated with a higher modulation and coding scheme than the second downlink message.

9. The method of claim 6, wherein the first downlink message is associated with a lower modulation and coding scheme than the second downlink message.

10. A method of wireless communication performed by a user equipment (UE), comprising:
    transmitting, to a base station, a capability message indicating a capability of the UE to receive one or more downlink messages during a time slot, wherein the capability message indicates that the UE is capable of receiving a single downlink message during the time slot;
    receiving, from the base station, one or more control signalings which schedule a first downlink message and a second downlink message during the time slot, indicate a first resource allocation scheduled by a first semi-persistent scheduling configuration, and indicate a second resource allocation scheduled by a second semi-persistent scheduling configuration; and
    receiving the first downlink message during the time slot based at least in part on the one or more control signalings and the capability message, wherein the first downlink message is received via a third resource allocation that comprises at least a portion of the first resource allocation and the second resource allocation.

11. A method of wireless communication performed by a user equipment (UE), comprising:
    transmitting, to a base station, a capability message indicating a capability of the UE to receive one or more downlink messages during a time slot;
    receiving, from the base station, one or more control signalings which schedule a first downlink message and a second downlink message during the time slot, indicate a first resource allocation scheduled by a first semi-persistent scheduling configuration, indicate a second resource allocation scheduled by a second semi-persistent scheduling configuration, and indicate that the first downlink message and the second downlink message are not overlapping in time and the first downlink message and the second downlink message each correspond to a same transmission configuration indication (TCI) state; and receiving, using a same receive beam corresponding to the same TCI state, the first downlink message and the second downlink message via the first resource allocation or the second resource allocation, or both based at least in part on the one or more control signalings and the capability message.

12. A method of wireless communication performed by a user equipment (UE), comprising:
transmitting, to a base station, a capability message indicating a capability of the UE to receive one or more downlink messages during a time slot;
receiving, from the base station, one or more control signalings which schedule a first downlink message and a second downlink message during the time slot, indicate a first resource allocation scheduled by a first semi-persistent scheduling configuration, indicate a second resource allocation scheduled by a second semi-persistent scheduling configuration, and indicate the first downlink message and the second downlink message are not overlapping in time and the first downlink message and the second downlink message each correspond to different TCI states;
receiving, using a first receive beam corresponding to a first TCI state of the different TCI states, at least a portion of the first downlink message via the first resource allocation based at least in part on the one or more control signalings and the capability message; and
receiving, using a second receive beam corresponding to a second TCI state of the different TCI states, at least a portion of the second downlink message via the second resource allocation based at least in part on the one or more control signalings and the capability message.

13. A method of wireless communication performed by a base station, comprising:
receiving, from a user equipment (UE), a capability message indicating a capability of the UE to receive one or more downlink messages during a time slot, wherein the capability message indicates that the UE is capable of receiving a single downlink message during the time slot;
transmitting, to the UE, one or more control signalings which schedule a first downlink message and a second downlink message during the time slot, indicate a first resource allocation scheduled by a first semi-persistent scheduling configuration, and indicate a second resource allocation scheduled by a second semi-persistent scheduling configuration; and
transmitting, via the first resource allocation, the first downlink message during the time slot based at least in part on the one or more control signalings and the capability message, wherein the first downlink message comprises a smaller number of configured repetitions than the second downlink message.

14. The method of claim 13, wherein the first downlink message comprises a larger transport block size, a larger number of coded bits, or both, than the second downlink message.

15. The method of claim 13, wherein the first downlink message is associated with a higher priority than the second downlink message.

16. The method of claim 13, wherein the first downlink message is associated with a lower modulation and coding scheme than the second downlink message.

17. The method of claim 13, wherein the first semi-persistent scheduling configuration is associated with an index value smaller than an index value associated with the second semi-persistent scheduling configuration.

18. A method of wireless communication performed by a base station, comprising:
receiving, from a user equipment (UE), a capability message indicating a capability of the UE to receive one or more downlink messages during a time slot;
transmitting, to the UE, one or more control signalings which schedule a first downlink message and a second downlink message during the time slot, indicate a first resource allocation scheduled by a first semi-persistent scheduling configuration, and indicate a second resource allocation scheduled by a second semi-persistent scheduling configuration; and
transmitting, via the second resource allocation, the first downlink message during the time slot based at least in part on the one or more control signalings and the capability message, wherein the second resource allocation is larger than the first resource allocation.

19. The method of claim 18, wherein transmitting the first downlink message is based at least in part on a transport block size corresponding to the second resource allocation.

20. The method of claim 18, wherein the first downlink message is associated with a higher modulation and coding scheme than the second downlink message.

21. The method of claim 18, wherein the first downlink message is associated with a lower modulation and coding scheme than the second downlink message.

22. A method of wireless communication performed by a base station, comprising:
receiving, from a user equipment (UE), a capability message indicating a capability of the UE to receive one or more downlink messages during a time slot;
transmitting, to the UE, one or more control signalings which schedule a first downlink message and a second downlink message during the time slot, indicate a first resource allocation scheduled by a first semi-persistent scheduling configuration, and indicate a second resource allocation scheduled by a second semi-persistent scheduling configuration; and
transmitting the first downlink message during the time slot based at least in part on the one or more control signalings and the capability message, wherein the first downlink message is transmitted via a third resource allocation that comprises at least a portion of the first resource allocation and the second resource allocation.

23. A method of wireless communication performed by a base station, comprising:
receiving, from a user equipment (UE), a capability message indicating a capability of the UE to receive one or more downlink messages during a time slot;
transmitting, to the UE, one or more control signalings which schedule a first downlink message and a second downlink message during the time slot, indicate a first resource allocation scheduled by a first semi-persistent scheduling configuration, indicate a second resource allocation scheduled by a second semi-persistent scheduling configuration, and indicate that the first downlink message and the second downlink message are not overlapping in time and the first downlink message and the second downlink message each correspond to a same transmission configuration indication (TCI) state; and transmitting, using a same transmit beam corresponding to the same TCI state, the first downlink message and the second downlink message via the first resource allocation or the second resource allocation, or both based at least in part on the one or more control signalings and the capability message.

24. A method of wireless communication performed by a base station, comprising:

receiving, from a user equipment (UE), a capability message indicating a capability of the UE to receive one or more downlink messages during a time slot;

transmitting, to the UE, one or more control signalings which schedule a first downlink message and a second downlink message during the time slot, indicate a first resource allocation scheduled by a first semi-persistent scheduling configuration, indicate a second resource allocation scheduled by a second semi-persistent scheduling configuration, and indicate the first downlink message and the second downlink message are not overlapping in time and the first downlink message and the second downlink message each correspond to different TCI states;

transmitting, using a first transmit beam corresponding to a first TCI state of the different TCI states, at least a portion of the first downlink message via the first resource allocation based at least in part on the one or more control signalings and the capability message; and transmitting, using a second transmit beam corresponding to a second TCI state of the different TCI states, at least a portion of the second downlink message via the second resource allocation based at least in part on the one or more control signalings and the capability message.

\* \* \* \* \*